United States Patent
Chen et al.

(10) Patent No.: US 12,200,716 B2
(45) Date of Patent: Jan. 14, 2025

(54) UPLINK POWER CONTROL WITH FALLBACK DOWNLINK CONTROL INFORMATION

(71) Applicant: QUALCOMM Incorporated, San Diego, CA (US)

(72) Inventors: Yitao Chen, San Diego, CA (US); Mostafa Khoshnevisan, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 631 days.

(21) Appl. No.: 17/392,625

(22) Filed: Aug. 3, 2021

(65) Prior Publication Data

US 2023/0045623 A1    Feb. 9, 2023

(51) Int. Cl.
*H04W 72/232*    (2023.01)
*H04L 5/00*    (2006.01)
(Continued)

(52) U.S. Cl.
CPC ........... *H04W 72/23* (2023.01); *H04L 5/0053* (2013.01)

(58) Field of Classification Search
CPC ..... H04W 72/23; H04W 52/08; H04W 52/32; H04W 52/325; H04W 52/54; H04L 5/0053
See application file for complete search history.

(56) References Cited

U.S. PATENT DOCUMENTS

2017/0280476 A1* 9/2017 Yerramalli ........ H04W 72/1268
2018/0332541 A1   11/2018 Liu et al.
(Continued)

FOREIGN PATENT DOCUMENTS

EP          3771258 A1    1/2021
WO    WO-2019159002 A1 *   8/2019   ........... H04L 5/0053
(Continued)

OTHER PUBLICATIONS

3GPP TSG-RAN WG1 Meeting#104bis-e, R1-2103550 Title: On PDCCH, PUCCH andPUSCH enhancement for multi-TRP (Year: 2021).*
(Continued)

*Primary Examiner* — Faruk Hamza
*Assistant Examiner* — Abusayeed M Haque
(74) *Attorney, Agent, or Firm* — Paul M. McADAMS; Holland & Hart LLP

(57) ABSTRACT

This disclosure provides methods for transmissions and retransmissions over a configured grant (CG) physical uplink shared channel (PUSCH) and for transmissions over physical uplink control channel (PUCCH) resources in multi-transmission and reception point (TRP) deployments. A user equipment (UE) may receive signaling configuring a first set of power control parameters and a second set of power control parameters for a CG-PUSCH resource. Additionally or alternatively, the UE may receive signaling activating a first closed-loop power control operation and a second closed-loop power control operation for a PUCCH resource. In some scenarios, the UE may receive a fallback downlink control information (DCI) format activating or scheduling the CG-PUSCH resource or indicating the PUCCH resource. In such scenarios, the UE may employ one or both of a power control selection rule or a transmit power control (TPC) command application rule for a trans- (Continued)

mission over the CG-PUSCH resource or the PUCCH resource.

18 Claims, 14 Drawing Sheets

(51) Int. Cl.
*H04W 52/32* (2009.01)
*H04W 72/23* (2023.01)

(56) References Cited

U.S. PATENT DOCUMENTS

| | | | | |
|---|---|---|---|---|
| 2019/0261281 | A1* | 8/2019 | Jung | H04W 72/0473 |
| 2019/0349867 | A1* | 11/2019 | MolavianJazi | H04L 5/0048 |
| 2020/0015200 | A1* | 1/2020 | Vilaipornsawai | H04W 72/23 |
| 2020/0109535 | A1* | 4/2020 | Finch | E02F 3/8155 |
| 2020/0314860 | A1* | 10/2020 | Zhou | H04W 72/23 |
| 2022/0109535 | A1 | 4/2022 | Kim et al. | |
| 2022/0159683 | A1* | 5/2022 | Islam | H04W 72/1268 |
| 2022/0330163 | A1* | 10/2022 | Liu | H04W 52/146 |
| 2023/0262708 | A1* | 8/2023 | Golitschek Edler von Elbwart | H04W 72/21 370/329 |

FOREIGN PATENT DOCUMENTS

| | | | | |
|---|---|---|---|---|
| WO | WO-2020091046 | A1 * | 5/2020 | |
| WO | WO-2021067703 | A1 * | 4/2021 | H04L 5/0096 |
| WO | WO-2021146161 | A1 | 7/2021 | |

OTHER PUBLICATIONS

3GPP TS 38.213: "3rd Generation Partnership Project, Technical Specification Group Radio Access Network, NR, Physical Layer Procedures For control (Release 16)", 3GPP Standard, Technical Specification, 3rd Generation Partnership Project, Mobile Competence Centre, 650, Route Des Lucioles, F-06921 Sophia-Antipolis Cedex, France, vol. RAN WG1, No. V16.5.0, Mar. 30, 2021, XP052000308, pp. 1-183.
3GPP TS 38.331: "3rd Generation Partnership Project, Technical Specification Group Radio Access Network, NR; Radio Resource Control (RRC) Protocol Specification (Release 16)", 3GPP TS 38.331 V16.5.0 (Jun. 2021), 38331-G50, 3rd Generation Partnership Project, Mobile Competence Centre, 650, Route Des Lucioles, F-06921 Sophia-Antipolis Cedex, France, Jul. 6, 2021, XP002805038, 956 Pages, Sections 4, 5.1.3, 5.3-5.5, 5.7.3, 5.7.3b, p. 1-p. 206.
"3rd Generation Partnership Project, Technical Specification Group Radio Access Network, NR, Medium Access Control (MAC) Protocol Specification (Release 16)", 3GPP Standard, Technical Specification, 3GPP TS 38.321, 3rd Generation Partnership Project, Mobile Competence Centre, 650, Route Des Lucioles, F-06921 Sophia-Antipolis Cedex, France, vol. RAN WG2, No. V16.5.0, Jul. 7, 2021, XP052030240, pp. 1-157, Section 6.1.3.25, p. 130-p. 131, Figures 6.1.3.25-1.
"3rd Generation Partnership Project, Technical Specification Group Radio Access Network, NR, Multiplexing and Channel Coding (Release 16)", 3GPP Standard, Technical Specification, 3GPP TS 38.212, 3rd Generation Partnership Project, Mobile Competence Centre, 650, Route Des Lucioles, F-06921 Sophia-Antipolis Cedex, France, vol. RAN WG1, No. V16.5.0, Mar. 30, 2021, XP052000306, pp. 1-152.
Partial International Search Report—PCT/US2022/037375—ISA/EPO—Oct. 26, 2022.
Ericsson: "On PDCCH, PUCCH and PUSCH Enhancements for Multi-TRP", 3GPP TSG-RAN WG1 Meeting #104bis-e, R1-2103550, 3rd Generation Partnership Project, Mobile Competence Centre, 650, Route Des Lucioles, F-06921 Sophia-Antipolis Cedex, France, vol. RAN WG1, No. e Meeting, Apr. 12, 2021-Apr. 20, 2021, Apr. 7, 2021, XP052178262, 30 Pages, Retrieved on Apr. 7, 2021, The Whole Document.
International Search Report and Written Opinion—PCT/US2022/037375—ISA/EPO—Jan. 18, 2023.

* cited by examiner

UPLINK POWER CONTROL WITH FALLBACK DOWNLINK CONTROL INFORMATION

TECHNICAL FIELD

The following relates to wireless communications, including techniques for uplink power control.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a base station may configure a UE with a configured grant (CG) for uplink transmissions. The CG may be associated with a type, such as a CG Type 1 or a CG Type 2. In cases in which the CG is Type 1, the base station may configure the UE with the CG via radio resource control (RRC) signaling that both configures and activates the CG. The UE may transmit an uplink transmission, which may be referred to herein as a CG uplink transmission, over resources associated with the CG as a result of the RRC signaling configuring and activating the CG. The base station may indicate a set of parameters for an initial transmission of a CG uplink transmission via the RRC signaling and, for a retransmission of the CG uplink transmission, the base station may indicate at least a portion of the set of parameters for retransmission via scheduling downlink control information (DCI). In cases in which the CG is of Type 2, the base station may similarly configure the CG via RRC signaling, which configures the CG but does not activate the CG. In such cases, the base station also transmits a DCI that activates the CG and indicates a set of parameters for a CG uplink transmission scheduled by the DCI. Some DCI formats, however, may be unable to provide information associated with some parameters for CG uplink transmissions, which may result in ambiguity at the UE in trying to apply the set of parameters for the CG uplink transmissions.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication at a user equipment (UE). The method may include receiving control signaling indicating a first sounding reference signal (SRS) resource set associated with a first set of power control parameters and a second SRS resource set associated with a second set of power control parameters, the first set of power control parameters and the second set of power control parameters for transmissions in a configured grant configuration, receiving downlink control information (DCI) for a configured grant uplink shared channel, and selectively transmitting based on a format of the DCI, over the configured grant (CG) uplink shared channel using one of the first set of power control parameters or the second set of power control parameters.

Another innovative aspect of the subject matter described in this disclosure can be implemented in an apparatus for wireless communication at a UE. The apparatus may include a processor, memory coupled with the processor, and instructions stored in the memory. The instructions may be executable by the processor to cause the apparatus to receive control signaling indicating a first SRS resource set associated with a first set of power control parameters and a second SRS resource set associated with a second set of power control parameters, the first set of power control parameters and the second set of power control parameters for transmissions in a CG configuration, receive DCI for a CG uplink shared channel, and selectively transmit, based on a format of the DCI, over the CG uplink shared channel using one of the first set of power control parameters or the second set of power control parameters.

Another innovative aspect of the subject matter described in this disclosure can be implemented in an apparatus for wireless communication at a UE. The apparatus may include means for receiving control signaling indicating a first SRS resource set associated with a first set of power control parameters and a second SRS resource set associated with a second set of power control parameters, the first set of power control parameters and the second set of power control parameters for transmissions in a CG configuration, means for receiving DCI for a CG uplink shared channel, the DCI having a format, and means for selectively transmitting, based on a format of the DCI, over the CG uplink shared channel using one of the first set of power control parameters or the second set of power control parameters.

Another innovative aspect of the subject matter described in this disclosure can be implemented in a non-transitory computer-readable medium storing code for wireless communication at a UE. The code may include instructions executable by a processor to receive control signaling indicating a first SRS resource set associated with a first set of power control parameters and a second SRS resource set associated with a second set of power control parameters, the first set of power control parameters and the second set of power control parameters for transmissions in a CG configuration, receive DCI for a CG uplink shared channel, and selectively transmit, based on a format of the DCI, over the CG uplink shared channel using one of the first set of power control parameters or the second set of power control parameters.

One innovative aspect of the subject matter described in this disclosure can be implemented in a method for wireless communication at a UE. The method may include receiving control signaling activating, for an uplink control channel resource, a first spatial relation associated with a first closed-loop power control operation and a second spatial relation associated with a second closed-loop power control operation, receiving DCI indicating a single transmit power control (TPC) command for the uplink control channel resource, selectively applying the single TPC command to one or both of the first closed-loop power control operation or the second closed-loop power control operation based on receiving the DCI, and transmitting over the uplink control channel resource based on the DCI and one or both of the first closed-loop power control operation or the second closed-loop power control operation.

Another innovative aspect of the subject matter described in this disclosure can be implemented in an apparatus for wireless communication at a UE. The apparatus may include a processor, memory coupled with the processor, and instructions stored in the memory. The instructions may be executable by the processor to cause the apparatus to receive control signaling activating, for an uplink control channel resource, a first spatial relation associated with a first closed-loop power control operation and a second spatial relation associated with a second closed-loop power control operation, receive DCI indicating a single TPC command for the uplink control channel resource, selectively apply the single TPC command to one or both of the first closed-loop power control operation or the second closed-loop power control operation based on receiving the DCI, and transmit over the uplink control channel resource based on the DCI and one or both of the first closed-loop power control operation or the second closed-loop power control operation.

Another innovative aspect of the subject matter described in this disclosure can be implemented in an apparatus for wireless communication at a UE. The apparatus may include means for receiving control signaling activating, for an uplink control channel resource, a first spatial relation associated with a first closed-loop power control operation and a second spatial relation associated with a second closed-loop power control operation, means for receiving DCI indicating a single TPC command for the uplink control channel resource, means for selectively applying the single TPC command to one or both of the first closed-loop power control operation or the second closed-loop power control operation based on receiving the DCI, and means for transmitting over the uplink control channel resource based on the DCI and one or both of the first closed-loop power control operation or the second closed-loop power control operation.

Another innovative aspect of the subject matter described in this disclosure can be implemented in a non-transitory computer-readable medium storing code for wireless communication at a UE. The code may include instructions executable by a processor to receive control signaling activating, for an uplink control channel resource, a first spatial relation associated with a first closed-loop power control operation and a second spatial relation associated with a second closed-loop power control operation, receive DCI indicating a single TPC command for the uplink control channel resource, selectively apply the single TPC command to one or both of the first closed-loop power control operation or the second closed-loop power control operation based on receiving the DCI, and transmit over the uplink control channel resource based on the DCI and one or both of the first closed-loop power control operation or the second closed-loop power control operation.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

Like reference numbers and designations in the various drawings indicate like elements.

DETAILED DESCRIPTION

Figure 1:
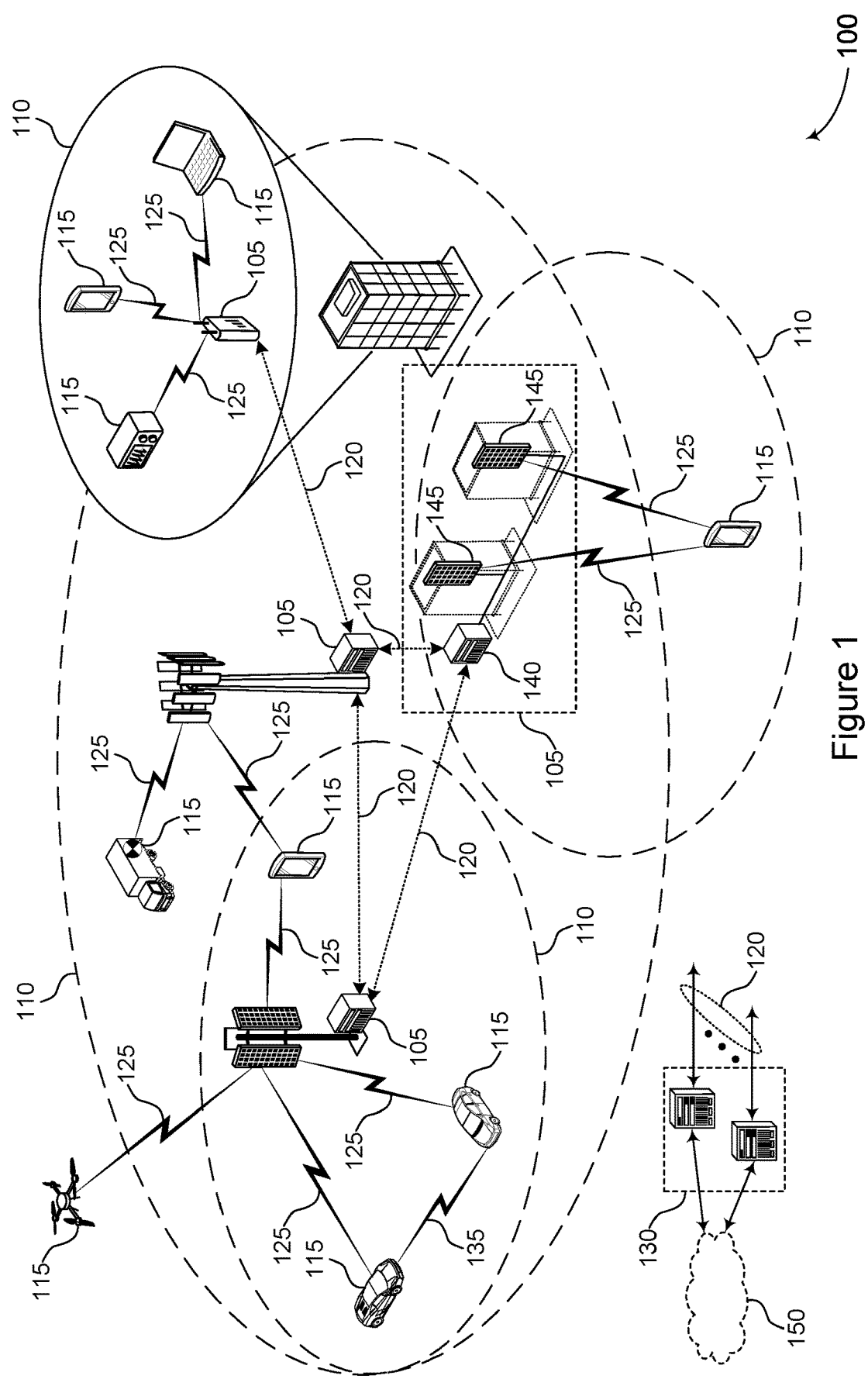
FIGS. 1-6 illustrate examples of wireless communications systems that support uplink power control with fallback downlink control information (DCI) in accordance with aspects of the present disclosure.

Configured grant (CG) uplink communications are communications in which a user equipment (UE) may receive a configuration in advance that applies to multiple uplink transmissions that the UE transmits on a semi-periodic basis. For example, a base station may configure the UE with either a Type 1 CG (such as a radio resource control (RRC) activated grant) or a Type 2 CG (such as a downlink control information (DCI) activated grant). In some examples, the base station may configure (via RRC signaling) the UE with multiple sounding reference signal (SRS) resource sets (such as two SRS resource sets) that correspond to a first beam and a first transmission and reception point (TRP) at the base station and to a second beam and a second TRP at the base station, respectively, and the UE and the base station may leverage the configured SRS resource sets for communicating CG uplink communication. To achieve dynamic switching between single TRP (sTRP) uplink transmissions and multi-TRP (mTRP) uplink transmissions, for example, the UE may receive DCI signaling including a field for dynamic switching that indicates which power control parameters and corresponding SRS resource sets to use for a CG uplink transmission, such as a CG physical uplink shared channel (CG-PUSCH) transmission. In some cases, however, a DCI message either activating a CG-PUSCH transmission or scheduling a retransmission for a CG-PUSCH transmission may lack a sufficient payload size to indicate which of multiple sets (for example, two sets) of power control parameters the UE may use for the CG-PUSCH transmission. For example, the base station may transmit the DCI message using a particular DCI format, such as DCI format 0_0, which may lack a sufficient quantity of bits to indicate which of the multiple sets of power control parameters the UE may use.

Further, the UE and the base station may support physical uplink control channel (PUCCH) transmissions in mTRP deployments and, in such deployments, the base station may activate a PUCCH resource with multiple spatial relation information identifiers. In some cases, a first spatial relation information identifier may be associated with a first beam, a first TRP, and a first closed-loop power control operation and a second spatial relation information identifier may be associated with a second beam, a second TRP, and a second closed-loop power control operation. To schedule a PUCCH transmission over a PUCCH resource that is activated with multiple spatial relation information identifiers and multiple closed-loop power control operations, the base station may transmit DCI indicating the PUCCH resource and may provide, in some DCI formats, multiple transmit power control (TPC) command fields such that each TPC command may apply to one closed-loop power control operation. In some cases, however, a DCI message indicating a PUCCH resource that is activated for multiple closed-loop power control operations may lack a sufficient payload size to indicate multiple TPC commands. For example, the base station may transmit the DCI message using a particular DCI format, such as DCI format 1_0, which may indicate a single TPC command. But, in such cases, the UE may be unaware of to which closed-loop power control operation the single TPC command applies.

Various aspects generally relate to situational-based or rule-based mechanisms for power control for CG-PUSCH and PUCCH transmissions, and more specifically to power control for CG-PUSCH and PUCCH transmissions in scenarios in which an activating, scheduling, or indicating DCI is unable to provide direction to the UE relating to directional uplink transmissions to the base station in mTRP deployments (direction as to which set of power control parameters the UE is to use for such directional uplink transmissions). In some aspects, the UE may selectively transmit a CG-PUSCH using one of the first set of power control parameters or the second set of power control parameters configured for the CG-PUSCH in scenarios in which the UE receives an activating or scheduling DCI that lacks a sufficient payload size to indicate which of the multiple sets of power control parameters that the UE is to use for the CG-PUSCH transmission. In some examples, the UE may select to use one of the multiple sets of power control parameters based on which of the multiple sets of power control parameters is configured first or based on signaling from the base station. Alternatively, the UE may refrain from transmitting the CG-PUSCH transmission in accordance with the power control selection rule. In some other aspects, the UE may selectively apply the single TPC command indicated by a DCI to one or both of the first closed-loop power control operation or the second closed-loop power control operation activated for an indicated PUCCH resource in scenarios in which the indicating DCI lacks a sufficient payload size to indicate to which of the multiple (for example, two) closed-loop power control operations the UE is to apply the single TPC command. In some examples, the UE may refrain from applying the single TPC command to any of the multiple closed-loop power control operations, may apply the single TPC command to each of the multiple closed-loop power control operations, or may apply the single TPC command to one of the multiple closed-loop closed operations in accordance with the TPC command application rule. As described in the various aspects, such a DCI that lacks a sufficient payload size to indicate power control information may be associated with a particular format (such as DCI format 0_0 or DCI format 1_0) and such a particular format may be referred to herein as a fallback format.

Particular aspects of the subject matter described in this disclosure may be implemented to realize one or more of the following potential advantages. The techniques employed by the described communication devices may provide benefits and enhancements to the operation of the communication devices, including enhanced power control operations for CG uplink transmissions and retransmissions as well as greater reliability and robustness for both CG-PUSCH transmissions and PUCCH transmissions in some deployments, including mTRP deployments. For example, as a result of employing the described techniques, the UE and the base station may avoid ambiguity as to which set of power control parameters are to be used for a CG-PUSCH, or to which closed-loop power control operations a TPC command is to be applied in scenarios in which an activating, scheduling, or indicating DCI is associated with the particular format, such as the fallback format. As such, the UE and the base station may maintain the reliability and robustness benefits associated with mTRP operation even in examples in which the base station transmits fallback DCI formats. Further, and as a result of such communication enhancements, the UE and the base station may experience greater system throughput, greater system capacity, higher data rates, and greater spectral efficiency, among other benefits.

FIG. 1 illustrates an example of a wireless communications system 100 that supports uplink power control with fallback downlink control information in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (for example, mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a geographic coverage area 110 over which the UEs 115 and the base station 105 may establish one or more communication links 125. The geographic coverage area 110 may be an example of a geographic area over which a base station 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (for example, directly between base stations 105), or indirectly (for example, via core network 130), or both. In some cases, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, and the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some cases, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some cases (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode according to which initial acquisition and connection may be conducted by the UEs 115 via the carrier, or the carrier may be operated in a non-standalone mode according to which a connection is anchored using a different carrier (for example, of the same or a different radio access technology).

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (for example, a duration of one modulation symbol) and one subcarrier, and the symbol period and subcarrier spacing are inversely related. The number of bits carried by each resource element may depend on the modulation scheme (for example, the order of the modulation scheme, the coding rate of the modulation scheme, or both). The more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds. In some cases, $\Delta f_{max}$ may represent an upper limit supported subcarrier spacing, and $N_f$ may represent an upper limit supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some cases, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some cases, the TTI duration (for example, the number of symbol periods in a TTI) may be variable. Additionally or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (for example, over a carrier) and may be associated with an identifier for distinguishing neighboring cells (for example, a physical cell identifier (PCID), a virtual cell identifier (VCID), or others). In some cases, a cell may also refer to a geographic coverage area 110 or a portion of a geographic coverage area 110 (for example, a sector) over which the logical communication entity operates. Such cells may range from smaller areas (for example, a structure, a subset of a structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A base station 105 may support one or multiple cells and may also support communications over the one or more cells using one or multiple component carriers.

In some cases, a carrier may support multiple cells, and different cells may be configured according to different protocol types (for example, MTC, narrowband IoT (NB-IoT), enhanced mobile broadband (eMBB)) that may provide access for different types of devices.

In some cases, a base station 105 may be movable and may provide communication coverage for a moving geographic coverage area 110. In some cases, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some cases, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a base station 105 without human intervention. In some cases, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of the UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or TRPs. Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some cases, the wireless communications system 100 may support millimeter wave (mmW) communications between the UEs 115 and the base stations 105, and EHF antennas of the respective devices may be smaller and more closely spaced than UHF antennas. In some cases, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some cases, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), according to which multiple spatial layers are transmitted to the same receiving device, and multiple-user MIMO (MU-MIMO), according to which multiple spatial layers are transmitted to multiple devices.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (for example, by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (for example, a direction associated with the receiving device, such as a UE 115). In some cases, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some cases, transmissions by a device (for example, by a base station 105 or a UE 115) may be performed using multiple beam directions, and the device may use a combination of digital precoding or radio frequency beamforming to generate a combined beam for transmission (for example, from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some cases, a receiving device may use a single receive configuration to receive along a single beam direction (for example, when receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (AR)). HARQ may improve throughput at the MAC layer in poor radio conditions (for example, low signal-to-noise conditions). In some cases, a device may support same-slot HARQ feedback, and the device may provide HARQ feedback in a specific slot for data received in a previous symbol in the slot. In other cases, the device may provide HARQ feedback in a subsequent slot, or according to some other time interval.

In some aspects, a base station 105 may transmit control signaling to a UE 115 that may configure the UE 115 with a CG configuration. For example, the control signaling may configure the UE 115 with either a Type 1 CG in which case the CG may be activated via RRC signaling or a Type 2 CG in which case the CG may be activated via a DCI activation message. In some aspects, the base station 105 may also configure the UE 115 with multiple SRS resource sets in which each SRS resource set corresponds to a beam and a TRP at the base station 105. As part of the CG configuration, the base station 105 may also configure the UE 115 with multiple sets of power control parameters that the UE 115 may associate with the multiple SRS resource sets for CG uplink transmissions. For example, the base station 105 may configure the UE 115 with two SRS resource sets and two sets of power control parameters, and the UE 115 may associate a first SRS resource set with a first set of power control parameters and a second SRS resource set with a second set of power control parameters. As such, the UE 115 may transmit a first CG uplink transmission (for example, a first CG-PUSCH transmission) using the first SRS resource set and the associated first set of power control parameters to a first TRP and may transmit a second CG uplink transmission (for example, a second CG-PUSCH transmission) using the second SRS resource set and the associated second set of power control parameters to a second TRP, allowing the base station 105 to participate in mTRP CG uplink transmissions. In some cases, the first TRP and second the second TRP may be located on the same base station 105 or different base stations 105.

The base station 105 may transmit an activating DCI (for Type 2 CG-PUSCH) or a scheduling DCI (for a retransmission of either a Type 1 CG-PUSCH or a Type 2 CG-PUSCH) and, in some examples, the DCI may be associated with a fallback DCI format. In such examples, the UE 115 may employ a power control selection rule according to which the UE 115 may selectively transmit the scheduled CG-PUSCH using one of the first set of power control parameters or the second set of power control parameters. Such a fallback DCI format may include a DCI format 0_0, which may have a relatively smaller payload size (for example, a quantity of bits) than some other DCI formats, such as a DCI format 0_1). An example content of a DCI format 0_0 is illustrated by Table 1.

TABLE 1

DCI Format 0_0

| Field | Number of Bits within DCI |
|---|---|
| DCI Format Identifier | 1 |
| Frequency Domain Resource Assignment | $[Log_2(N_{RB}^{UL,BWP} \times (N_{RB}^{UL,BWP}+1)/2)]$ |
| Time Domain Resource Assignment | 4 |
| Frequency Hopping Flag | 1 |
| Modulation and Coding Scheme (MCS) | 5 |
| New Data Indicator (NDI) | 1 |
| Redundancy Version (RV) | 2 |
| HARQ Process Number | 4 |
| TPC Command for Scheduled PUSCH | 2 |
| Padding | depends upon size of DCI Format 1_0 |
| Uplink/Supplemental Uplink Indicator | 1 or 0 |

Further, the UE 115 and the base station 105 may support PUCCH transmissions in mTRP deployments and, in such deployments, the base station may activate a PUCCH resource with two spatial relation information identifiers. In some cases, a first spatial relation information identifier may be associated with a first beam, a first TRP, and a first closed-loop power control operation and a second spatial relation information identifier may be associated with a second beam, a second TRP, and a second closed-loop power control operation. To schedule a PUCCH transmission over a PUCCH resource that is activated with two spatial relation information identifiers and two closed-loop power control operations, the base station may transmit DCI indicating the PUCCH resource and may provide, in some DCI formats, two TPC command fields such that each TPC command may apply to one closed-loop power control operation.

In some other examples, the indicating DCI may be associated with a fallback DCI format, such as a DCI format 1_0. Such a DCI format 1_0 may be used for scheduling of a physical downlink shared channel (PDSCH) transmission in one cell and, in some examples, may indicate a PUCCH resource for UCI (for example, for feedback responsive to the PDSCH). In some cases, the base station 105 may transmit the DCI format 1_0 in an attempt to maintain connection if the base station 105 detects a coverage deterioration. In such examples in which the DCI has a DCI format 1_0, the DCI may indicate a single TPC command and the UE 115 may employ a TPC command application rule to selectively apply the single TPC command to one or both of the first closed-loop power control operation or the second closed-loop power control operation. An example content of a DCI format 1_0 is illustrated by Table 2.

TABLE 2

DCI Format 1_0

| Field | Number of Bits within DCI |
|---|---|
| DCI Format Identifier | 1 |
| Frequency Domain Resource Assignment | $[Log_2(N_{RB}^{DL,BWP} \times (N_{RB}^{DL,BWP}+1)/2)]$ |
| Time Domain Resource Assignment | 4 |
| VRB-to-PRB mapping | 1 |
| Modulation and Coding Scheme (MCS) | 5 |
| New Data Indicator (NDI) | 1 |
| Redundancy Version (RV) | 2 |
| HARQ Process Number | 4 |
| TPC Command for Scheduled PUCCH | 2 |
| PUCCH resource indicator | 3 |
| PDSCH-to-HARQ feedback timing indicator | 3 |

Figure 2:
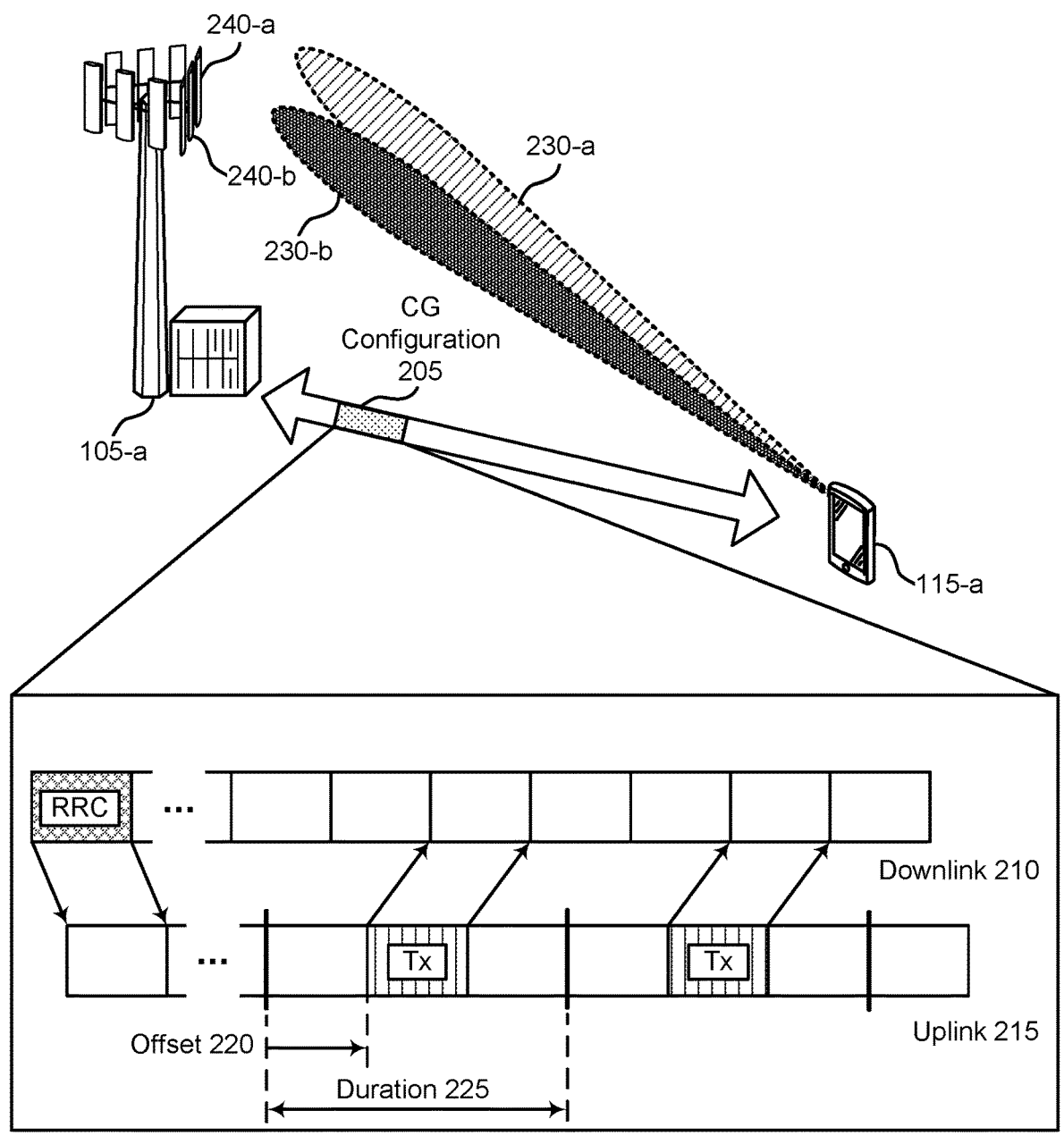

FIG. 2 illustrates an example of a wireless communications system 200 that supports uplink power control with fallback DCI in accordance with aspects of the present disclosure. The wireless communications system 200 may implement or be implemented to realize aspects of the wireless communications system 100. For example, the wireless communications system 200 may include a UE 115-a and a base station 105-a (or one or more components of the base station 105-a), which may be examples of corresponding devices described herein, including with reference to FIG. 1. In some examples, the UE 115-a may receive a configuration of multiple SRS resource sets 235 and each of the multiple SRS resource sets 235 may be associated with different sets of power control parameters for a Type 1 CG uplink transmission (for example, for a Type 1 CG-PUSCH). In such examples, the UE 115-a may select to use one of the different sets of power control parameters for a retransmission of the Type 1 CG uplink transmission in accordance with a power control selection rule in scenarios in which a scheduling DCI has a fallback DCI format.

In the wireless communications system 200, the base station 105-a may configure the UE 115-a with a CG configuration 205 for CG uplink transmissions. In some examples, the base station 105-a may transmit the CG configuration 205 to the UE 115-a via RRC signaling, such as the RRC signaling illustrated as being sent by the base station 105-a over a downlink 210. The base station 105-a may indicate, via the CG configuration 205, whether a CG uplink transmission is associated with a Type 1 CG (which may be equivalently referred to as an uplink CG Type 1) or a Type 2 CG (which may be equivalently referred to as an uplink CG Type 2).

The wireless communications system 200 may illustrate examples in which the CG configuration 205 indicates a Type 1 CG and, as such, communications between the UE 115-a and the base station 105-a over the downlink 210 and an uplink 215 may reflect communication associated with Type 1 CG uplink transmissions. In cases in which the CG configuration 205 indicates a Type 1 CG, the base station 105-a may, in addition to configuring uplink transmission parameters at the UE 115-a via RRC signaling, activate or deactivate a grant for the CG uplink transmissions via RRC signaling. Alternatively, in cases in which the CG configuration 205 indicates a Type 2 CG, the base station 105-a may transmit additional signaling, such as DCI, to activate or deactivate the CG uplink transmissions. Additional details relating to examples in which the CG configuration 205 indicates a Type 2 CG are illustrated by and described in more detail with reference to FIG. 3.

In cases in which the CG configuration 205 indicates a Type 1 CG, the CG configuration 205 may configure, indicate, or otherwise provide a number of transmission parameters to the UE 115-a that the UE 115-a may use for the CG uplink transmissions. For example, the base station 105-a may transmit the CG configuration 205 to the UE 115-a including or indicating one or both of a ConfiguredGrantConfig parameter or an rrc-ConfiguredUplinkGrant parameter. In some cases, the number of uplink transmission parameters that the CG configuration 205 includes or indicates may be common to both Type 1 CG and Type 2 CG or may be associated with one of Type 1 CG or Type 2 CG. For example, the ConfiguredGrantConfig parameter may be common to both Type 1 CG and Type 2 CG uplink transmissions and the rrc-ConfguredUplinkGrant parameter may be specific to Type 1 CG uplink transmissions.

In some cases, the uplink transmission parameters that the base station 105-a may configure for the CG uplink transmissions from the UE 115-a may include or indicate a number of power control parameters. In such cases, the power control parameters may include a value corresponding to a target power spectral density (for example, a P0 value), a value that indicates whether to enable or disable fractional power control for the CG uplink transmissions (for example, an alpha value), or a closed loop index. As such, the base station 105-a may configure the power control parameters corresponding to the CG uplink transmissions via the CG configuration 205 (for example, via RRC signaling). For example, the ConfiguredGrantConfig parameter (which the base station 105-a may include within the CG configuration 205) may include apO-PUSCH-Alpha parameter (which may configure the P0 value and the alpha value) and may include apowerControlLoopToUse parameter (which may configure the closed loop index value).

Further, the CG configuration 205 may indicate an offset 220, a duration 225 (which may be associated with a period of the CG uplink transmissions), or any other parameter (such as a modulation and coding scheme (MCS), a k value for feedback, or a demodulation reference signal (DMRS) configuration) that the UE 115-a and the base station 105-a may use for scheduling or performing the CG uplink transmissions (for example, the Tx's as illustrated in the uplink 215) over specific durations (for example, slots, spans, symbols, or TTIs). For example, and as shown in the wireless communications system 200, the base station 105-a, using the CG configuration 205, may configure the UE 115-a with a TTI or a period spanning three slots. In other words, the duration 225 of the TTI or period may be three slots. Further, the base station 105-a, using the CG configuration 205, may configure the UE 115-a with an offset 220 of one slot. As such, the UE 115-a may transmit the CG uplink transmissions over a second slot of the configured TTI (for example, a second slot of the configured period of the Type 1 CG uplink transmissions).

In some cases, the UE 115-a may also receive, from the base station 105-a via the CG configuration 205, a configuration of a path loss reference signal (PL-RS). The configuration of the PL-RS may vary depending on whether the CG configuration indicates a Type 1 CG or a Type 2 CG. For example, in cases in which the CG configuration 205 indicates the Type 1 CG, the base station 105-a may configure an initial transmission via a pathlossReferenceIndex parameter in the rrc-ConfiguredUplinkGrant parameter (which the base station 105-a may include within the CG configuration 205). For a retransmission of a Type 1 CG uplink transmission, a scheduling DCI may indicate the configuration of the PL-RS (for example, via an SRS resource indicator (SRI) field of the scheduling DCI).

The UE 115-a may be configured to transmit CG uplink transmissions in accordance with a "codebook" based transmission or a "non-codebook" based transmission. As such, the UE 115-a may be configured to use an SRS resource set 235 with a usage set to codebook or non-codebook, respectively. In cases in which the SRS resource set 235 has a usage set to codebook, the UE 115-a may be configured with an SRS resource limit. For example, the UE 115-a may be configured with, for example, a given quantity of SRS resources, such as a limited quantity of four SRS resources, within the SRS resource set 235. In such cases, each SRS resource may be RRC configured with (for example, the UE 115-a may receive RRC signaling from the base station 105-a indicating) a number of ports (for example, indicated by a parameter nrofSRS-Ports). In some cases, the base station 105-a may indicate a single SRS resource from the SRS resource set 235 within an uplink DCI message, such as a DCI message scheduling uplink retransmissions. In such cases, the number of ports configured for the indicated SRS resource may indicate the number of antenna ports for CG uplink transmissions. Further, the UE 115-a may transmit PUSCH (for example, CG uplink transmissions) using a same spatial domain filter (for example, a same beam 230) as the SRS resource indicated by the base station 105-a. In some cases, the base station 105-a may indicate a rank and a precoder for PUSCH (for example, the CG uplink transmissions), to the UE 115-a. For example, the base station 105-a may transmit, within a DCI field different than the SRI field (for example, a field for precoding information and number of layers), a number of layers and a transmitted precoding matrix indicator (TPMI) for scheduled CG uplink transmissions.

In cases in which the SRS resource set 235 has a usage set to non-codebook, the UE 115-a may similarly be configured with as SRS resource limit. For example, the UE 115-a may be configured to use, for example, a given quantity of SRS resources, such as a limited quantity of four SRS resources. In such examples, each SRS resource may be associated with a single, respective port. In some cases, the base station 105-a may indicate a number of SRS resources, from the SRS resource set 235, within an uplink DCI message (for example, a retransmission scheduling DCI message). The number of SRS resources indicated in such a DCI may indicate the rank for the PUSCH the scheduling DCI message may be associated with.

For example, the number of SRS resources indicated in a PUSCH scheduling DCI message may indicate, to the UE 115-*a*, the number of transmission layers the UE 115-*a* may use if transmitting CG uplink transmissions scheduled by such a DCI. Further, the PUSCH (for example, CG uplink transmissions) may be transmitted with a same precoder, spatial domain filter (for example, beam 230), and any other transmission parameter, associated with the number of SRS resources indicated by the base station 105-*a*. In some cases, the base station 105-*a* may configure the UE 115-*a* with an SRS resource set 235 with a non-zero power (NZP) CSI-RS resource (for example, using RRC parameters associated with CSI-RSs). In such cases, the UE 115-*a* may determine (for example, calculate) a precoder used for the SRS resources within the SRS resource set 235 based on measuring the associated NZP CSI-RS resource. Further, in some aspects, the UE 115-*a* and the base station 105-*a* may support a dmrs-SeqInitialization parameter in the ConfiguredGrantConfig parameter, some level of RV mapping, and some possible transmission occasion for an initial transmission of CG uplink transmissions.

In some examples, the base station 105-*a* may receive CG uplink transmissions from the UE 115-*a* at multiple TRPs 240 or multiple panels. For example, as a result of receiving the CG uplink transmissions from the UE 115-*a* at the multiple TRPs 240 or the multiple panels, the UE 115-*a* and the base station 105-*a* may support greater robustness and reliability for the CG uplink transmissions. If a TRP 240-*a* associated with the base station 105-*a* is blocked via a physical object (such as a tree, a moving car, a building, among other examples) or the TRP 240-*a* otherwise experiences interference (such as interference from signaling from other UEs 115 or self-interference), for example, the base station 105-*a* may still be able to decode a CG uplink transmission at a TRP 240-*b* associated with the base station 105-*a*, increasing uplink reception reliability at the base station 105-*a*. In some examples, the TRP 240-*b* may be located at a secondary base station 105, and the UE 115-*a* may transmit CG uplink transmissions to multiple base stations 105. In other words, the TRP 240-*a* and the TRP 240-*b* may be located at same (or approximately the same) physical locations or may be located at different physical locations without exceeding the scope of the present disclosure.

Additionally or alternatively, the UE 115-*a* may transmit CG uplink transmissions with repetition. In some examples, the UE 115-*a* may receive (from the base station 105-*a* and, for example, via RRC signaling or DCI) signaling indicating a type of repetition that the UE 115-*a* may use for transmitting the CG uplink transmissions, such as a Type A repetition or a Type B repetition. In examples in which the UE 115-*a* receives signaling indicating the Type A repetition, the UE 115-*a* may transmit over different CG uplink transmission occasions that correspond to a same transport block and the different CG uplink transmission occasions may be in different slots. In examples in which the UE 115-*a* receives signaling indicating the Type B repetition, the UE 115-*a* may transmit different CG uplink transmission occasions that correspond to a same transport block and the different CG uplink transmission occasions may be in different mini-slots (which may be smaller in symbol size or duration than slots).

The base station 105-*a* may configure a number of repetitions for a CG uplink transmission via RRC signaling or dynamically via DCI (for example, via a time domain resource assignment (TDRA) field that is part of a DCI message). In some cases, the UE 115-*a* may transmit the repetitions of the CG uplink transmission using a same beam 230. For example, the UE 115-*a* may transmit the repetitions of the CG uplink transmission using a beam 230-*a* and the base station 105-*a* may receive the repetitions of the CG uplink transmission sent using the beam 230-*a* at a single TRP 240 (or, in some examples, may attempt to receive the single beam transmissions at multiple TRPs 240). In such examples in which the UE 115-*a* transmits the repetitions of the CG uplink transmission via the same beam 230, the UE 115-*a* may transmit the repetitions of the CG uplink transmission using a same set of transmission power control parameters.

In some other cases, if the base station 105-*a* intends to receive different uplink repetitions at different TRPs 240, different panels, or different antennas, the base station 105-*a* may configure the UE 115-*a* to use multiple beams 230 (such as the beam 230-*a* and a beam 230-*b*) and multiple sets of power control parameters. For example, repetitions of the CG uplink transmission may belong to or may be associated with multiple (for example, two) SRS resource sets 235 and each SRS resource set 235 may be associated with a beam 230 and a set of power control parameters. In other words, the scheduled or configured repetitions of the CG uplink transmission may be partitioned into two distinct sets of repetitions and the two sets of repetitions may correspond to two SRS resource sets 235 (such that each set of repetitions corresponds to a different SRS resource set 235 and a different beam 230 and a different set of power control parameters). An SRS resource set 235-*a* may be associated with the beam 230-*a* and a first set of power control parameters and an SRS resource set 235-*b* may be associated with the beam 230-*b* and a second set of power control parameters. In some examples, and as a result of the correspondence between the two sets of repetitions and the two SRS resource sets 235, the base station 105-*a* may indicate two beams 230 or two sets of power control parameters, or both, for two sets of repetitions by two corresponding SRI fields in a DCI message (for example, a retransmission scheduling DCI for a Type 1 CG).

In some deployments, for example, the UE 115-*a* and the base station 105-*a* may support a dynamic switching between sTRP operation and mTRP operation and the UE 115-*a* and the base station 105-*a* may leverage the correspondence between the two sets of repetitions and the two SRS resource sets 235 for the dynamic switching. In such deployments, the base station 105-*a* may alternate between an sTRP-based receiving of a PUSCH transmission and an mTRP-based receiving of the PUSCH transmission, which may include indicating the UE 115-*a* to use one SRS resource set 235 for sTRP operation and two SRS resource sets 235 for mTRP operation. To achieve such a dynamic switching between sTRP operation and mTRP operation for PUSCH transmissions, the base station 105-*a* may transmit a DCI message to the UE 115-*a* including a bit field for dynamic switching that indicates which SRS resource set 235 and corresponding set of power control parameters to use for different repetitions of the PUSCH transmission.

For example, the bit field for dynamic switching may have a size of two bits and may indicate one of four configurations for the PUSCH transmission (for example, for the two sets of repetitions of the PUSCH transmission). If the bit field for dynamic switching has a value '00', the UE 115-*a* may use the SRS resource set 235-*a* that is associated with the first set of power control parameters and the beam 230-*a* for the PUSCH transmission (for example, for each repetition of the PUSCH transmission). In such examples in which the UE 115-*a* uses the first set of power control parameters and the beam 230-*a* for the repetitions of the PUSCH transmission, the base station 105-*a* may receive the repetitions of the PUSCH transmission via one TRP 240 (such as the TRP 240-*a*). Alternatively, if the bit field for dynamic switching has a value '01', the UE 115-*a* may use the SRS resource set 235-*b* that is associated with the second set of control parameters and the beam 230-*b* for the PUSCH transmission (for example, for each repetition of the PUSCH transmission). In such examples in which the UE 115-*a* uses the second set of power control parameters and the beam 230-*b* for the repetitions of the PUSCH transmission, the base station 105-*a* may receive the repetitions of the PUSCH transmission via one TRP 240 (such as the TRP 240-*b*).

Alternatively, if the bit field for dynamic switching has a value '10', the UE 115-*a* may alternate between the SRS resource set 235-*a* and the SRS resource set 235-*b* for the repetitions of the PUSCH transmission in accordance with a first order pattern. For example, the UE 115-*a* may use the first set of power control parameters and the beam 230-*a* for a first set of instances of the PUSCH transmission and may use the second set of power control parameters and the beam 230-*b* for a second set of instances of the PUSCH transmission. In such examples, the base station 105-*a* may receive the first set of instances of the repetitions of the PUSCH transmission via the TRP 240-*a* and may receive the second set of instances of the repetitions of the PUSCH transmission via the TRP 240-*b*. Alternatively, if the bit field for dynamic switching has a value '11', the UE 115-*a* may alternate between the SRS resource set 235-*a* and the SRS resource set 235-*b* in accordance with a second order pattern. For example, the UE 115-*a* may use the second set of power control parameters and the beam 230-*b* for a first set of instances of the PUSCH transmission and may use the first set of power control parameters and the beam 230-*a* for a second set of instances of the PUSCH transmission. In such examples, the base station 105-*a* may receive the first set of instances of the repetitions of the PUSCH transmission via the TRP 240-*b* and may receive the second set of instances of the repetitions of the PUSCH transmission via the TRP 240-*a*. Such order patterns and example transmission mappings are illustrated by and described in more detail with reference to FIG. 4.

To support an extension of PUSCH repetition with two beams 230 and two sets of power control parameters to CG uplink transmissions (for example, to CG-PUSCH transmissions), the base station 105-*a* may additionally configure the second set of power control parameters for the UE 115-*a* via RRC signaling. In other words, the base station 105-*a* may configure the UE 115-*a* with the first set of power control parameters for the beam 230-*a* (which may both be associated with the SRS resource set 235-*a*) and the second set of power control parameters for the beam 230-*b* (which may both be associated with the SRS resource set 235-*b*) via RRC signaling. For example, the base station 105-*a* may include a second pathlossReferenceIndex parameter, a second srs-ResourceIndicator parameter, and a second precodingAndNumberOfLayers parameter in the rrc-ConfiguredUplinkGrant parameter and may include a second p0-PUSCH-Alpha parameter and a second powerControlLoopToUse parameter in the ConfiguredGrantConfig parameter.

For a Type 1 CG, the base station 105-*a* may both configure and activate the SRS resource sets 235 for the CG uplink transmission from the UE 115-*a* via RRC signaling. For example, the CG configuration 205 may configure the UE 115-*a* with a number of SRS resource sets 235 and transmission parameters (for example, the sets of power control parameters) associated therewith, and the CG configuration 205 may also activate the use of such SRS resource sets 235 for the CG uplink transmission. In such examples, the base station 105-*a* may refrain from transmitting a DCI message activating the SRS resource sets 235, for example, as would otherwise be the case in Type 2 CG (as described in more detail with reference to FIG. 3).

In some examples, the base station 105-*a* may provide information otherwise indicated in an SRI field (for example, within an activation DCI message) using a number of RRC parameters. For example, the base station 105-*a* may transmit an SRI, precoding information, or a rank, among other examples, using RRC parameters, such as an srs-ResourceIndicator parameter (for the SRI) and a precodingAndNumberOfLayers parameter (for the precoding information and the rank).

In some cases in which the CG configuration 205 indicates a Type 1 CG, the base station 105-*a* may transmit a DCI to schedule a retransmission of the CG uplink transmission and, in such cases, the UE 115-*a* may use some parameters that are RRC configured and some parameters that are indicated by the scheduling DCI. For example, for a Type 1 CG retransmission, the UE 115-*a* may use one or two P0 values, one or two alpha values, and one or two closed-loop indexes (for example, one field or two fields for each depending on whether the base station 105-*a* is functioning in accordance with an sTRP deployment for an mTRP deployment, respectively) that are RRC configured and may use a configuration of a PL-RS that is indicated by an SRI field (or SRI fields for mTRP deployments, such that two PL-RSs are indicated) in the scheduling DCI. Further, the UE 115-*a* may receive, from the base station 105-*a* and for the Type 1 CG retransmission, an indication of one or more TPMIs or a number of layers by one or more SRI fields in the scheduling DCI. In some cases, whether one or two sets of power control parameters (for example, P0, alpha, PL-RS, or closed loop index), one or two TPMIs, and one or two beams are to be applied for the Type 1 CG retransmission is indicated by the DCI field for dynamic switching.

In scenarios in which the base station 105-*a* configures the UE 115-*a* with two SRS resource sets 235 (for codebook or non-codebook PUSCH transmissions) and in which the CG configuration 205 indicates two different sets of power control parameters, the scheduling DCI for the Type 1 CG retransmission may sometimes lack sufficient information to indicate which of the two sets of power control parameters the UE 115-*a* is to use for the CG uplink transmission (the Type 1 CG retransmission). For example, some DCI formats (such as a DCI format 0_0) may be associated with a relatively smaller payload as compared to other DCI formats (such as a DCI format 0_1) and such relatively smaller payload DCI formats may be referred to herein as fallback DCI formats. In some cases, a fallback DCI format, such as the DCI format 0_0, may lack an SRI field and may be unable to indicate which of the two sets of power control parameters to use as a result of being unable to point to one of the two configured SRS resource sets 235.

For example, the CG configuration 205 may configure the SRS resource set 235-*a* and the SRS resource set 235-*b* for CG uplink transmissions and the SRS resource set 235-*a* may be associated with the first set of power control parameters (for example, a first p0-PUSCH-Alpha parameter and a first powerControlLoopToUse parameter) and the SRS resource set 235-*b* may be associated with the second set of power control parameters (for example, a second p0-PUSCH-Alpha parameter and a second powerControl-LoopToUse parameter). The scheduling DCI, if having a DCI format 0_0, however, may be unable to provide an indication indicating one of the SRS resource sets 235 or otherwise distinguishing between the two SRS resource sets 235. As such, the UE 115-*a* may experience ambiguity as to which set of power control parameters the UE 115-*a* is to apply (and which beam 230 the UE 115-*a* is to use) for the Type 1 CG retransmission, which may result in communication failures between the UE 115-*a* and the base station 105-*a*.

In some implementations, the UE 115-*a* may employ a power control selection rule for selecting to use one of the first set of power control parameters or the second set of power control parameters in such scenarios in which multiple SRS resource sets 235, each associated with a different set of power control parameters, are configured for a Type 1 CG uplink transmission and a scheduling DCI for a retransmission of the Type 1 CG uplink transmission has a fallback DCI format (for example, a DCI format 0_0). In some examples, and in accordance with the power control selection rule, the UE 115-*a* may select, as a default in such scenarios, the first set of power control parameters (for example, the first p0-PUSCH-Alpha parameter and the first powerControlLoopToUse parameter).

In some other examples, the UE 115-*a* may not expect such a scenario to occur and the UE 115-*a* may treat the scheduling DCI as an error case. For example, the UE 115-*a* may not expect a DCI format 0_0 with cyclic redundancy check (CRC) scrambled with configured scheduling (CS) radio network temporary identifier (RNTI) with NDI=1 to indicate a CG identifier associated with the Type 1 CG uplink transmission that is associated with two SRS resource sets 235. In such examples, the UE 115-*a* may ignore the scheduling DCI and refrain from transmitting the retransmission of the Type 1 CG uplink transmission. In some other examples, the UE 115-*a* may receive, from the base station 105-*a*, control signaling (such as RRC signaling) indicating which set of power control parameters the UE 115-*a* may select for the scheduled retransmission of the Type 1 CG uplink transmission. For example, the base station 105-*a* may transmit additional RRC signaling indicating one of the first set of power control parameters or the second set of power control parameters and, in accordance with the power control selection rule, the UE 115-*a* may select the indicated set of power control parameters in scenarios in which a fallback DCI format schedules a retransmission of the Type 1 CG uplink transmission that is associated with two SRS resource sets 235.

Figure 3:
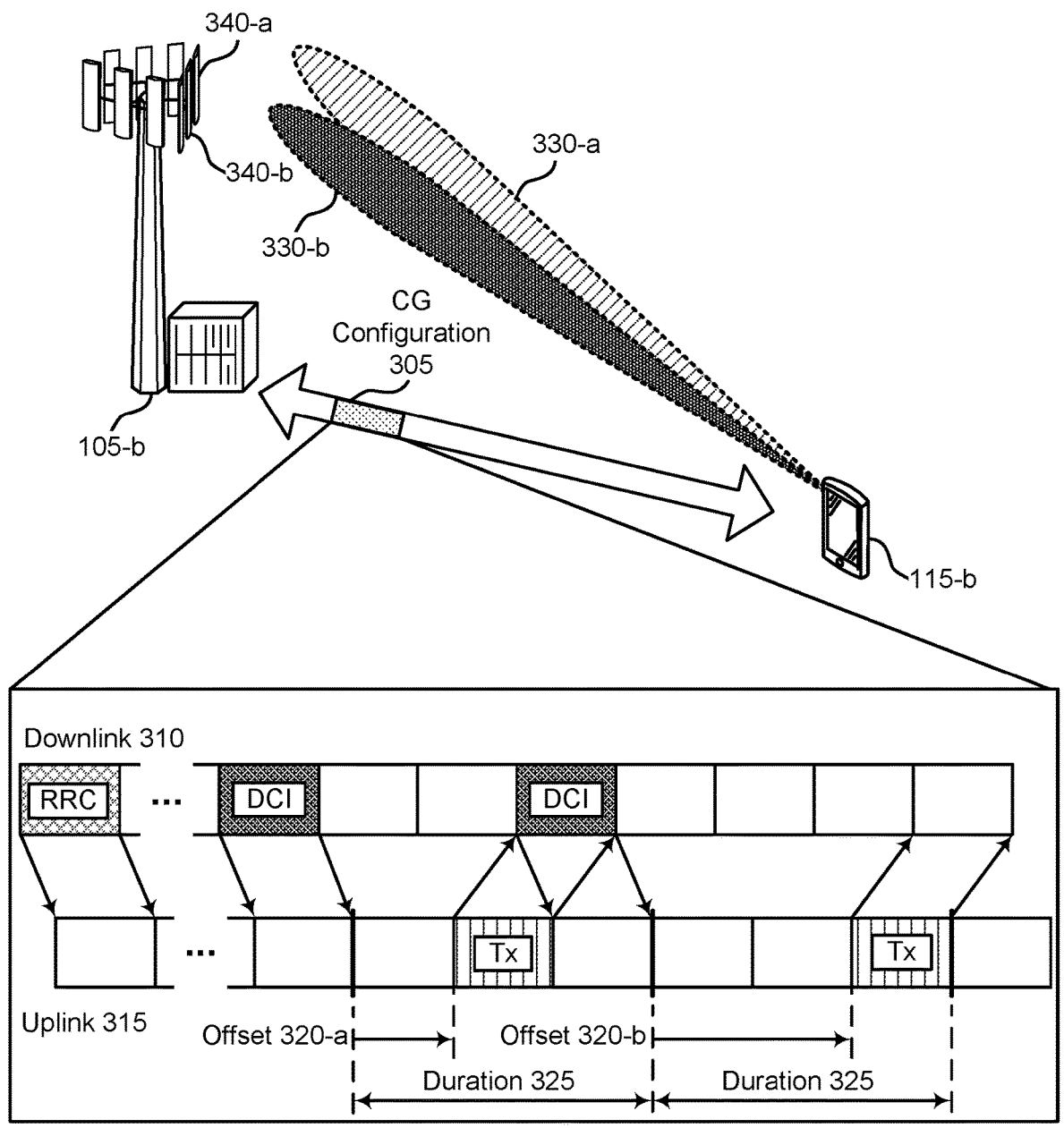

FIG. 3 illustrates an example of a wireless communications system 300 that supports uplink power control with fallback DCI in accordance with aspects of the present disclosure. The wireless communications system 300 may implement or be implemented to realize aspects of the wireless communications system 100 or the wireless communications system 200. For example, the wireless communications system 300 may include a UE 115-*b* and a base station 105-*b* (or one or more components of the base station 105-*b*), which may be examples of corresponding devices described herein, including with reference to FIGS. 1 and 2. In some examples, the UE 115-*b* may receive a configuration of multiple SRS resource sets 335, such as an SRS resource set 335-*a* and an SRS resource set 335-*b*, and each of the multiple SRS resource sets 335 may be associated with different sets of power control parameters for a Type 2 CG uplink transmission. In such examples, the UE 115-*a* may select to use one of the different sets of power control parameters for an initial transmission or a retransmission of the Type 2 CG uplink transmission in accordance with a power control selection rule in scenarios in which an activating or scheduling DCI has a fallback DCI format.

In the wireless communications system 300, the base station 105-*b* may configure the UE 115-*b* with a CG configuration 305 for CG uplink transmissions. In some examples, the base station 105-*b* may transmit the CG configuration 305 to the UE 115-*b* via RRC signaling, such as the RRC signaling illustrated as being sent by the base station 105-*b* over a downlink 310. The base station 105-*b* may indicate, via the CG configuration 305, whether a CG uplink transmission is associated with a Type 1 CG (which may be equivalently referred to as an uplink CG Type 1) or a Type 2 CG (which may be equivalently referred to as an uplink CG Type 2).

The wireless communications system 300 may illustrate examples in which the CG configuration 305 indicates a Type 2 CG and, as such, communications between the UE 115-*b* and the base station 105-*b* over the downlink 310 and an uplink 315 may reflect Type 2 CG uplink transmissions. In cases in which the CG configuration 305 indicates a Type 2 CG, the base station 105-*b* may configure some uplink transmission parameters via the CG configuration 305 (for example, via RRC signaling) and may configure some other uplink transmission parameters via DCI. For example, the UE 115-*b* may receive, from the base station 105-*b*, a ConfiguredGrantConfig parameter via the CG configuration 305 providing some RRC-configured parameters, while the base station 105-*b* may configure or indicate some other parameters via activating or scheduling DCI.

Further, in such cases, the base station 105-*b* may transmit the DCI (for example, the DCI indicating some uplink transmission parameters) may activate or deactivate a grant for the Type 2 CG uplink transmission. For example, the grant may be active once the UE 115-*b* receives an activation DCI and the grant may be deactivated once the UE 115-*b* receives a deactivation DCI. Such an activation DCI may have a CRC scrambled with CS-RNTI with NDI=0 and RV=0 (for validation). In some cases, multiple CG configurations 305 may be RRC configured by the base station 105-*b*, and a HARQ process number (HPN) field of an activating or release DCI may be used to indicate activation or release of a certain CG configuration 305.

As described in more detail with reference to FIG. 2, the CG configuration may configure or indicate a number of power control parameters, including one or more of a P0 value, an alpha value, a closed loop index. For example, the ConfiguredGrantConfig parameter (which the base station 105-*b* may include within the CG configuration 305) may include a p0-PUSCH-Alpha parameter (which may configure the P0 value and the alpha value) and may include apowerControlLoopToUse parameter (which may configure the closed loop index value). Such RRC-configured power control parameters may be used for Type 1 CG or Type 2 CG, as well as for any retransmissions of a CG uplink transmission. As such, the base station 105-*b* may refrain from using an SRI field of DCI (an activating DCI for Type 2 CG or a scheduling DCI for a retransmission of either a Type 1 or a Type 2 CG) for the purpose of configuring such power control parameters. Further, for a Type 2 CG initial transmission or for a retransmission of either Type 1 CG or a Type 2 CG, the SRI field of the activating or scheduling DCI may indicate a configuration for the PL-RS.

Further, the CG configuration 305 may indicate a duration 325 (which may be associated with a period of the CG uplink transmissions) or any other parameter (such as an MCS or a k value for feedback) that the UE 115-b and the base station 105-b may use for scheduling or performing the CG uplink transmissions (for example, the Tx's as illustrated in the uplink 315 over specific durations (for example, slots, spans, symbols, or TTIs). For example, and as shown in the wireless communications system 300, the base station 105-b, using the CG configuration 305, may configure the UE 115-a with a TTI or a period spanning three slots. In other words, the duration 325 of the TTI or period may be three slots. Further, the base station 105-b, using DCI, may configure the UE 115-b with one or more offsets 320, such as an offset 320-a and an offset 320-b, indicating deltas or gaps, in the time domain, between an activating or scheduling DCI and a corresponding CG uplink transmission. In some cases of Type 2 CG-PUSCH, the activating or scheduling DCI may indicate one or more of an activation, a deactivation, the offsets 320, an MCS, or a DMRS configuration.

As also described in more detail with reference to FIG. 2, the UE 115-b and the base station 105-b may support mTRP operation or multi-panel operation to increase robustness and reliability of CG uplink transmissions. For example, the base station 105-b may feature, operate, or otherwise communicate via a TRP 340-a and a TRP 340-b and may configure transmissions from the UE 115-b to one or both of the TRPs 340 to increase spatial diversity between the UE 115-b and the base station 105-b. The TRP 340-a and the TRP 340-b may be located at same (or approximately the same) physical locations or may be located at different physical locations without exceeding the scope of the present disclosure.

Additionally or alternatively, the UE 115-b may transmit CG uplink transmissions with repetition. In some examples, the UE 115-b may receive (from the base station 105-b and, for example, via RRC signaling or DCI) signaling indicating a type of repetition that the UE 115-b may use for transmitting the CG uplink transmissions, such as a Type A repetition or a Type B repetition. The base station 105-b may configure a number of repetitions for a CG uplink transmission via RRC signaling or dynamically via DCI and the UE 115-b may transmit the repetitions of the CG uplink transmission using a same beam 330 or using different beams 330 (for example, a beam 330-a and a beam 330-b). In some cases, and as described in more detail with reference to FIG. 2, the UE 115-b may use a same set of power control parameters if transmitting the repetitions using a same beam 330 or may use different sets of power control parameters if transmitting the repetitions using different beams 330. In examples in which the UE 115-b uses a same beam 330 for the repetitions of the CG uplink transmission, the UE 115-b may apply an SRI field of the activating or scheduling DCI to repetitions of the CG uplink transmission. For example, the SRI field of the DCI may indicate a beam or power control for a PUSCH by pointing to or indicating a number of SRS resources within an SRS resource set 335.

In examples in which the UE 115-b transmits the repetitions of the CG uplink transmission using different beams 330, the repetitions of the CG uplink transmission may belong to or may be associated with multiple (for example, two) SRS resource sets 335 and each SRS resource set 335 may be associated with a beam 330 and a set of power control parameters. In other words, the scheduled or configured repetitions of the CG uplink transmission may be partitioned into two distinct sets of repetitions and the two sets of repetitions may correspond to two SRS resource sets 335 (such that each set of repetitions corresponds to a different SRS resource set 335 and a different beam 330 and a different set of power control parameters). An SRS resource set 335-a may be associated with the beam 330-a and a first set of power control parameters and an SRS resource set 335-b may be associated with the beam 330-b and a second set of power control parameters. In some examples, and as a result of the correspondence between the two sets of repetitions and the two SRS resource sets 335, the base station 105-b may indicate two beams 330 or two sets of power control parameters, or both, for two sets of repetitions by two corresponding SRI fields in a DCI message (for example, a retransmission scheduling DCI for a Type 1 CG or a Type 2 CG or an activation DCI for a Type 2 CG).

In some deployments, for example, the UE 115-b and the base station 105-b may support a dynamic switching between sTRP and mTRP and the UE 115-b and the base station 105-b may leverage the correspondence between the two sets of repetitions and the two SRS resource sets 335 for the dynamic switching, as described in more detail with reference to FIG. 2. Further, to support an extension of PUSCH repetition with two beams 330 and two sets of power control parameters to CG uplink transmissions (for example, CG-PUSCH transmissions), the base station 105-b may additionally configure the second set of power control parameters for the UE 115-b via RRC signaling. In other words, for example, the base station 105-b may configure the UE 115-b with the first set of power control parameters for the beam 330-a (which are both associated with the SRS resource set 335-a) and the second set of power control parameters for the beam 330-b (which are both associated with the SRS resource set 335-b) via RRC signaling. As such, and as described in more detail with reference to FIG. 2, for Type 2 CG-based mTRP PUSCH repetition, a first set of p0-PUSCH-Alpha and powerControlLoopToUse parameters may be associated with the SRS resource set 335-a and a second set of p0-PUSCH-Alpha and powerControlLoopToUse parameters may be associated with the SRS resource set 335-b.

For a Type 2 CG, the base station 105-b may configure such different sets of power control parameters via RRC signaling and may indicate which set of power control parameters the UE 115-b is to use via an activating to scheduling DCI. For example, the UE 115-b may apply, for a Type 2 CG uplink transmission, the first set of power control parameters, the second set of power control parameters, or both sets of power control parameters based on the DCI field (for dynamic switching) of the activating or scheduling DCI. In some cases, for Type 2 CG-based mTRP PUSCH, the base station 105-b may transmit a DCI including two SRI fields or two TPMI fields to indicate which set of power control parameters the UE 115-b is to use for a Type 2 CG uplink transmission. In some aspects, such an indication of which set of power control parameters to use via a DCI field may be similar to cases of dynamic grant (DG) uplink transmissions (for example, DG-PUSCH transmissions).

For example, for DG-PUSCH, the base station 105-b may indicate power control parameters (for example, P0, alpha, PL-RS, and closed-loop index) by an SRI field of a DCI scheduling the PUSCH. In such examples, a set of P0 and alpha values are configured for open-loop control and each member of the set may be associated with an identifier and a list of PL-RSs are configured and each member of the list may be associated with an identifier. Further, a list of SRI-PUSCH mappings are configured and each member of the list may be associated with an identifier, such as an sri-PUSCH-PowerControlId: 0, . . . , 15. Each member of a sri-PUSCH-PowerControl parameter may be associated with an sri-PUSCH-PowerControlId parameter, an sri-PUSCH-PathlossReferenceRS-Id parameter, an sri-p0-PUSCH-AlphaSetId parameter, and an sri-PUSCH-ClosedLoopIndex parameter. For example, if a value of an SRI field of the DCI scheduling the PUSCH is x, the UE 115-*b* may use the uplink power control parameters corresponding to sri-PUSCH-PowerControlId=x for the PUSCH transmission.

In scenarios in which the base station 105-*b* configures the UE 115-*b* with two SRS resource sets 335 (for codebook or non-codebook PUSCH transmissions) and in which the CG configuration 305 indicates two different sets of power control parameters, the activating or scheduling DCI for the Type 2 CG uplink transmission may sometimes lack sufficient information to indicate which of the two sets of power control parameters the UE 115-*b* is to use for the CG uplink transmission (the Type 2 CG retransmission). For example, some DCI formats (such as a DCI format 0_0) may be associated with a relatively smaller payload as compared to other DCI formats (such as a DCI format 0_1) and such relatively smaller payload DCI formats may be referred to herein as fallback DCI formats. In some cases, a fallback DCI format, such as the DCI format 0_0, may lack an SRI field or a TPMI field and may be unable to indicate which of the two sets of power control parameters to use as a result of being unable to point to one of the two configured SRS resource sets 335 via the SRI or TPMI field. Further, some systems may prohibit an addition of two bits for dynamic switching to fallback DCI formats, as such fallback DCI formats may purposefully be associated with a smaller payload to provide a greater likelihood for successful communication in poor channel conditions.

In some implementations, the UE 115-*a* may employ a power control selection rule for selecting to use one of the first set of power control parameters or the second set of power control parameters in such scenarios in which multipole SRS resource sets 335, each associated with a different set of power control parameters, are configured for a Type 2 CG uplink transmission and in which an activating or scheduling DCI has a fallback DCI format (for example, a DCI format 0_0). In some examples, and in accordance with the power control selection rule, the UE 115-*b* may select, as a default in such scenarios, the first set of power control parameters (for example, the first p0-PUSCH-Alpha parameter and the first powerControlLoopToUse parameter).

In some other examples, the UE 115-*b* may not expect such a scenario to occur and the UE 115-*b* may treat the activating or scheduling DCI as an error case. For example, the UE 115-*b* may not expect a DCI format 0_0 with CRC scrambled with CS-RNTI with NDI=0 and RV=0 to indicate a CG identifier associated with the Type 2 CG uplink transmission that is associated with two SRS resource sets 335. In such examples, the UE 115-*b* may ignore the activating or scheduling DCI and refrain from transmitting the Type 2 CG uplink transmission. In some other examples, the UE 115-*b* may receive, from the base station 105-*b*, control signaling (such as RRC signaling) indicating which set of power control parameters the UE 115-*b* may select for the scheduled Type 2 CG uplink transmission. For example, the base station 105-*b* may transmit additional RRC signaling indicating one of the first set of power control parameters or the second set of power control parameters and, in accordance with the power control selection rule, the UE 115-*b* may select the indicated set of power control parameters in scenarios in which a fallback DCI format schedules the Type 2 CG uplink transmission that is associated with two SRS resource sets 335.

Figure 4:
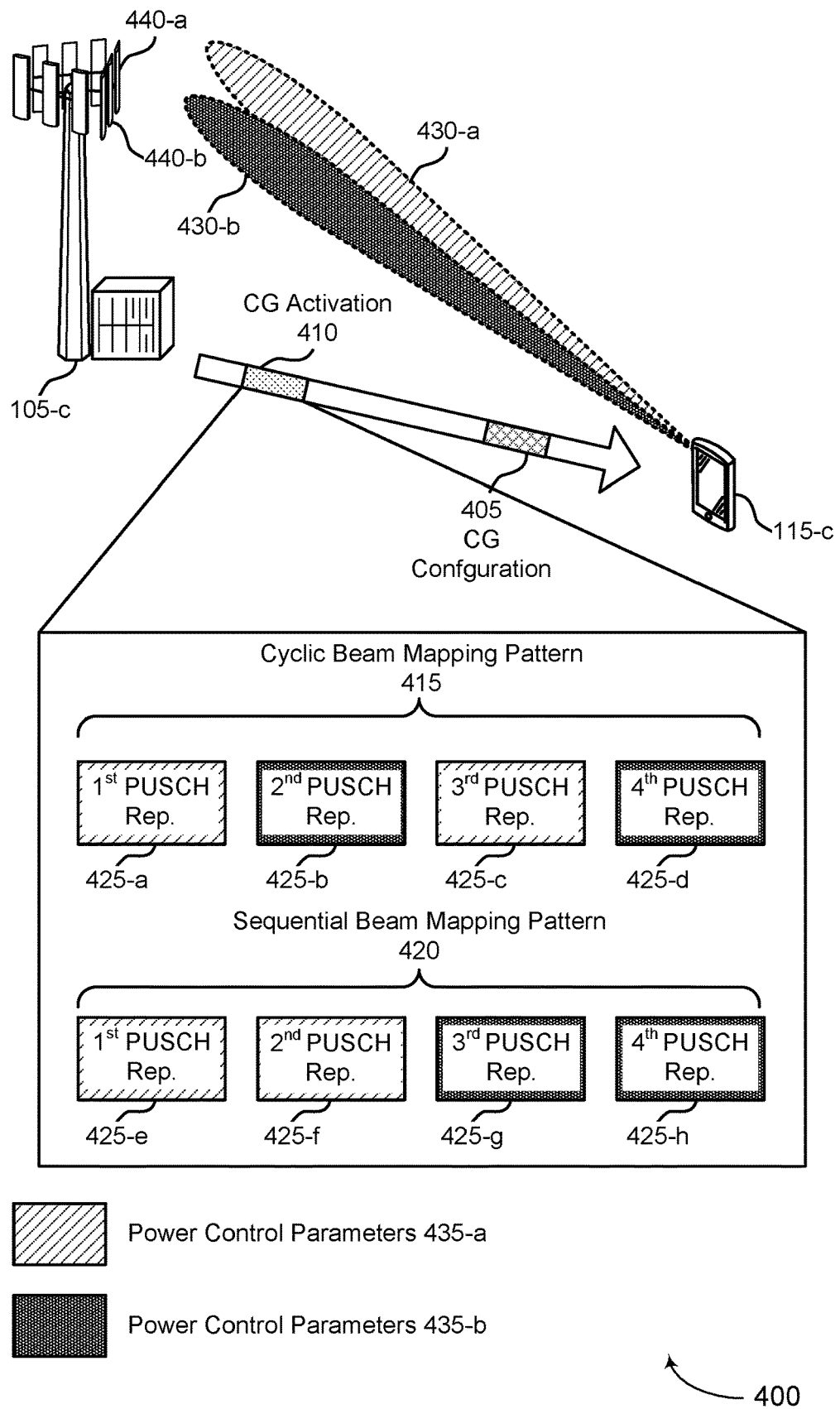

FIG. 4 illustrates an example of a wireless communications system 400 that supports uplink power control with fallback DCI in accordance with aspects of the present disclosure. The wireless communications system 400 may implement or be implemented to realize aspects of the wireless communications system 100, the wireless communications system 200, or the wireless communications system 300. For example, the wireless communications system 400 may include a UE 115-*c* and a base station 105-*c* (or one or more components of the base station 105-*c*), which may be examples of corresponding devices described herein, including with reference to FIGS. 1-3. The base station 105-*c* may configure the UE 115-*c* with a CG configuration 405 for multiple CG uplink transmissions 425 using multiple beams 430 with corresponding power control parameters 435. In some examples, the CG configuration 405, which may be an example of the CG configuration 205 or a CG configuration 305 as described with reference to FIGS. 2 and 3, respectively, may indicate a number of SRS resource set configurations for the UE 115-*c* to use and each SRS resource set may be associated with a set of power control parameters 435 and a beam 430. As such, the UE 115-*c* may employ a power control selection rule to determine which set of power control parameters 435 and which beam 430 to use for transmitting the CG uplink transmissions 425.

In the example of wireless communications system 400, the UE 115-*c* may transmit repetitions, such as four repetitions, of the CG uplink transmissions 425 and may alternate between transmitting the CG uplink transmissions 425 to the TRP 440-*a* using a first SRS resource set corresponding to the set of power control parameters 435-*a* and the beam 430-*a* and transmitting the CG uplink transmissions 425 to the TRP 440-*b* using a second SRS resource set corresponding to the set of power control parameters 435-*b* and the beam 430-*b*.

In some examples, the CG configuration 405 message may indicate a given beam mapping pattern for the CG uplink transmissions 425, such as a cyclic beam mapping pattern 410 or a sequential beam mapping pattern 415, and the UE 115-*c* may transmit the CG uplink transmissions in accordance with the mean mapping pattern. In such examples, the UE 115-*c* may receive the beam mapping via RRC signaling. In examples in which the CG configuration 405 indicates the cyclic beam mapping pattern 410, the UE 115-*c* may alternate between the first SRS resource set and the second SRS resource set. In other words, the UE 115-*c* may alternate between the first SRS resource set and the second SRS resource set after each CG uplink transmission 425 occasion. For example, the UE 115-*c* may transmit the CG uplink transmission 425-*a* and the CG uplink transmission 425-*c* to the TRP 440-*a* using the first SRS resource set and may transmit the CG uplink transmission 425-*b* and the CG uplink transmission 425-*d* to the TRP 440-*b* using the second SRS resource set.

In examples in which the CG configuration 405 indicates the sequential beam mapping pattern 415, the UE 115-*c* may sequentially transmit some first quantity, such as a first half, of CG uplink transmissions 425 using the first SRS resource set and may switch to transmit some second quantity, such as a second half, of the CG uplink transmissions 425 using the second SRS resource set. In some implementations, the first quantity may be the same as the second quantity (for example, each may be a half of the CG uplink transmissions 425 and a number of repetitions of for the CG uplink transmissions 425 may be an even number). In some other implementations, the first quantity may be different than the second quantity (for example, the first quantity may be a greater quantity or a lesser quantity of the CG uplink transmissions 425 compared to the second quantity). For example, the UE 115-c may transmit the CG uplink transmission 425-e and the CG uplink transmission 425-f to the TRP 440-a using the first SRS resource set and may transmit the CG uplink transmission 425-g and the CG uplink transmission 425-h to the TRP 440-b using the second SRS resource set.

In some cases, the base station 105-c may transmit an activating or scheduling DCI for the CG uplink transmissions 425 (for example, for an initial transmission of the CG uplink transmissions 425 if for a Type 2 CG or for a retransmission of the CG uplink transmissions if for a Type 1 CG or a Type 2 CG) and, in some scenarios, the base station 105-c may transmit the activating or scheduling DCI with a fallback DCI format (for example, a DCI format 0_0). In such scenarios, the DCI may lack a sufficient quantity of fields or bits to indicate which of the set of power control parameters 435 the UE 115-c may use for the CG uplink transmissions 425. As such, in some implementations, the UE 115-c may selectively transmit the CG uplink transmissions 425 using one of the set of power control parameters 435-a or the set of power control parameters 435-b in accordance with a power control selection rule, as described in more detail herein, including with reference to FIGS. 2 and 3.

Figure 5:
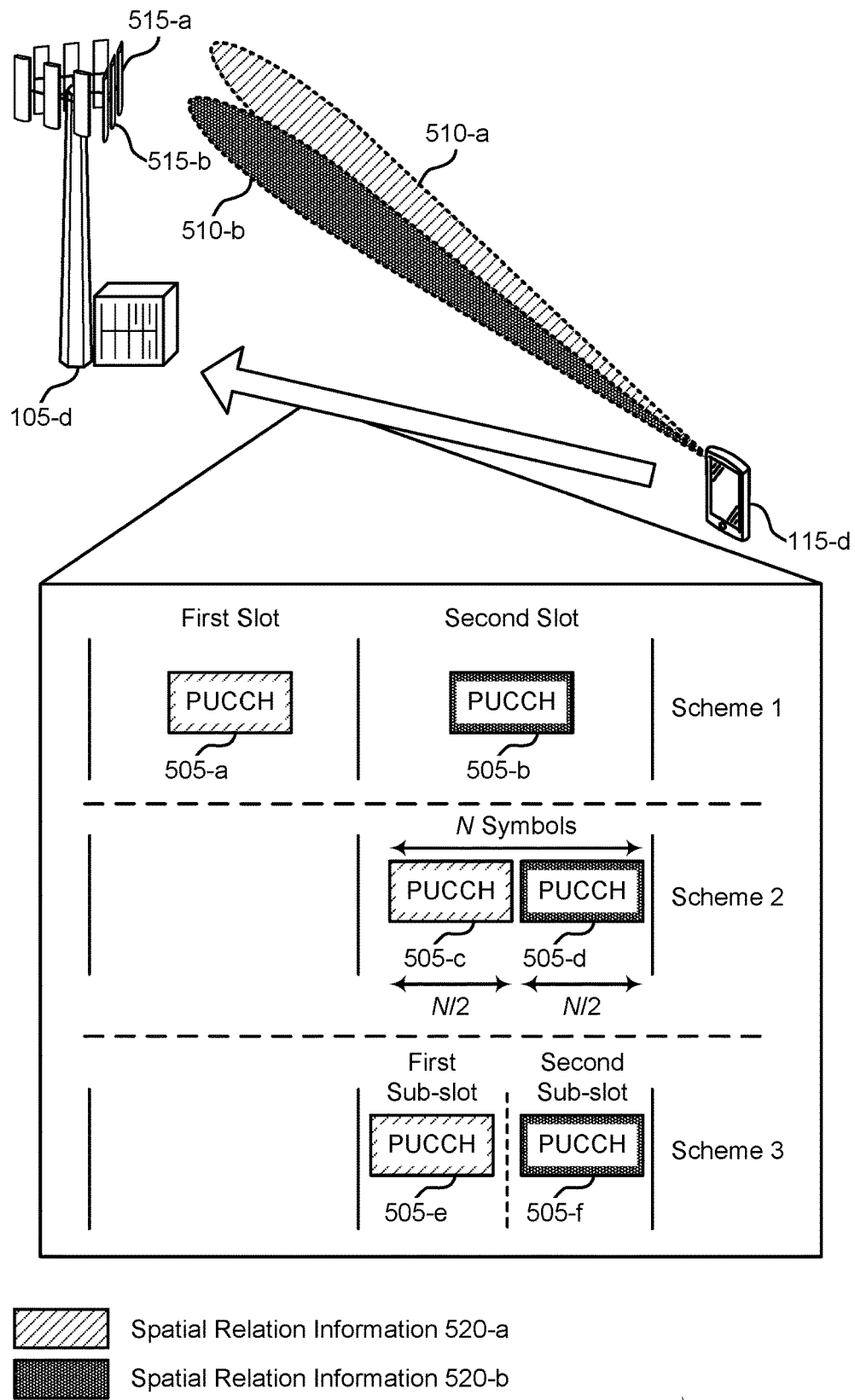

FIG. 5 illustrates an example of a wireless communications system 500 that supports uplink power control with fallback DCI in accordance with aspects of the present disclosure. The wireless communications system 500 may implement or be implemented to realize aspects of the wireless communications system 100, the wireless communications system 200, the wireless communications system 300, or the wireless communications system 400. For example, the wireless communications system 500 may include a UE 115-d and a base station 105-d (or one or more components of the base station 105-d), which may be examples of corresponding devices described herein, including with reference to FIGS. 1-4. In some examples, the UE 115-d may support mTRP operation for PUCCH transmissions 505 based on transmitting a number of repetitions of a PUCCH transmission 505 using different beams 510, each beam 510 associated with a different spatial relation information 520.

For example, the base station 105-d may configure a spatial setting for a PUCCH transmission 505 via a PUCCH-SpatialRelationInfo information element. In some cases, the base station 105-d may configure up to eight PUCCH-SpatialRelationInfold's via RRC signaling for PUCCH resources commonly (as opposed to for each PUCCH resource individually) and various parameters of the PUCCH-SpatialRelationInfo information element may indicate, to the UE 115-d, how different spatial relation information 520 corresponds to different beams 510. For example, a referenceSignal parameter may indicate a beam 510 (for example, an uplink beam) by associated with an SSB, a CSI-RS, or an SRS reference signal. In such examples, the UE 115-d may transmit a PUCCH transmission 505 using a same spatial domain filter as for a reception of a synchronization signal or physical broadcast channel (PBCH) block with a resource index provided by ssb-Index, a CSI-RS with resource index provided by csi-RS-Index, or an SRS with a resource index provided by resource.

In some cases, for a given PUCCH resource, the base station 105-d may transmit a MAC control element (MAC-CE) activating one of the up to eight PUCCH-SpatialRelationInfold's. For example, each PUCCH resource may be associated with one spatial relation information 520 and the base station 105-d may convey the association by setting one bit in a bitmap of S0, . . . , S7 equal to one (and the rest equal to zero). In some other cases, the UE 115-d and the base station 105-d may support PUCCH repetition (intra-slot or inter-slot) with different beams 510. In such cases, for example, the base station 105-d may activate up to two spatial relation information 520 for each PUCCH resource (for example, via MAC-CE) and such an activation of two spatial relation information 520 may enable PUCCH transmissions 505 of the same uplink control information (UCI) to different TRPs 515 associated with the base station 105-d (for greater reliability).

In some radio frequency spectrum bands, such as in FR2 radio frequency spectrum bands, the PUCCH transmissions may have different beams 510 (for example, different spatial relation information 520) and different transmit powers. In some other radio frequency bands, such as in FR1 radio frequency spectrum bands, the PUCCH transmissions 505 may have different transmit power but the base station 105-d may not define or configure a beam 510 (for example, a spatial relation information 520). To support the use of different beams 510 (and different spatial relation information 520) for repetitions of PUCCH transmissions 505 (for example, to support mTRP operation), the UE 115-d and the base station 105-d may support various schemes (such as various TDM schemes).

For example, a first scheme (a scheme 1) may support mTRP inter-slot repetition according to which one PUCCH resource carries UCI and a same PUCCH resource in another one or more slots carries a repetition of the UCI. The UE 115-d and the base station 105-d may support any number of repetitions in any number of slots. As shown in the wireless communications system 500, and in accordance with the first scheme, the UE 115-d may transmit a PUCCH transmission 505-a using a beam 510-a associated with a spatial relation information 520-a in a first slot and may transmit a PUCCH transmission 505-b using a beam 510-b associated with a spatial relation information 520-b in a second slot and both the PUCCH transmission 505-a and the PUCCH transmission 505-b may carry a same UCI. In such examples, the base station 105-d may receive the PUCCH transmission 505-a via a TRP 515-a and may receive the PUCCH transmission 505-b via a TRP 515-b.

A second scheme (a scheme 2) may support mTRP intra-slot beam hopping according to which the UE 115-d may transmit UCI in one PUCCH resource and may use different beams 510 for different sets of symbols within the one PUCCH resource. For example, the one PUCCH resource may include N symbols and the UE 115-d may transmit a PUCCH transmission 505-c over a first set of symbols (such as a first quantity of N/2 symbols) using the beam 510-a associated with the spatial relation information 520-a and may transmit a PUCCH transmission 505-d over a second set of symbols (such as a second quantity of N/2 symbols) using the beam 510-b associated with the spatial relation information 520-b. The PUCCH transmission 505-c and the PUCCH transmission 505-d may include two different portions of one UCI or may include repetitions of a same UCI. In such examples, the base station 105-d may receive the PUCCH transmission 505-*c* via the TRP 515-*a* and may receive the PUCCH transmission 505-*d* via the TRP 515-*b*.

A third scheme (a scheme 3) may support mTRP intra-slot repetition according to which the UE 115-*d* may transmit UCI in one PUCCH resource and may transmit a repetition of the UCI in the same PUCCH resource in another one or more sub-slots within a slot. For example, the UE 115-*d* may transmit a PUCCH transmission 505-*e* over a first sub-slot using the beam 510-*a* associated with the spatial relation information 520-*a* and may transmit a PUCCH transmission 505-*f* over a second sub-slot using the beam 510-*b* associated with the spatial relation information 520-*b*. In such examples, the base station 105-*d* may receive the PUCCH transmission 505-*e* via the TRP 515-*a* and may receive the PUCCH transmission 505-*f* via the TRP 515-*b*.

In some examples, the UE 115-*d* and the base station 105-*d* may employ closed-loop power control for the PUCCH transmissions for each TRP 515. As such, the UE 115-*d* and the base station 105-*d* may support a different closed-loop power control procedure for each associated set of beam 510, TRP 515, and spatial relation information 520. For example, the UE 115-*d* and the base station 105*d* may support a first closed-loop power control procedure that is associated with a first closed-loop index for the beam 510-*a*, the TRP 515-*a*, and the spatial relation information 520-*a* and may support a second closed-loop power control procedure that is associated with a second closed-loop index for the beam 510-*b*, the TRP 515-*b*, and the spatial relation information 520-*b*. To support closed-loop power control for each TRP 515, the base station 105-*d* may configure a second TPC field for some DCI formats, such as DCI formats 1_1 and 1_2, via RRC signaling such that the DCI formats 1_1 and 1_2 include two TPC fields. The base station 105-*d* may use each TPC field for each closed-loop index value, respectively. In some examples, the UE 115-*d* and the base station 105-*d* may support a configured mapping between the two TPC fields and the two closed-loop power control procedures.

In examples in which the base station 105-*d* does not configure the second TPC field via RRC signaling, the base station 105-*d* may transmit a single TPC field in DCI formats 1_1 and 1_2 and the UE 115-*d* may apply the TPC value indicated by the single TPC field for the closed-loop index (es) for the scheduled PUCCH transmission 505. Further, to support closed-loop power control for each TRP for PUSCH transmissions with DCI formats 0_1 or 0_2, the UE 115-*d* and the base station 105-*d* may perform similar tasks as those described herein for mTRP PUCCH schemes. In some cases, the UE 115-*d* may report a capability on whether the UE 115-*d* is capable or able to support a second TPC field and closed-loop power control for each TRP may be applicable for some deployments. For example, closed-loop power control for each TRP may be applicable for deployments in which closedLoopIndex values are different for the TRP 515-*a* and the TRP 515-*b*.

In scenarios in which the base station 105-*d* activates a PUCCH resource with two closed-loop power control procedures and in which the base station 105-*d* has configured the second TPC field for some DCI formats, a scheduling DCI may sometimes still include a single TPC field indicating a single TPC value. For example, some DCI formats (such as a DCI format 1_0) may be associated with a relatively smaller payload as compared to other DCI formats (such as a DCI formats 1_1 or 0_2) and such relatively smaller payload DCI formats may be referred to herein as fallback DCI formats. In some cases, a fallback DCI format, such as the DCI format 1_0, may be unable to carry two TPC fields, as such fallback DCI formats may purposefully be associated with a smaller payload to provide a greater likelihood for successful communication in poor channel conditions.

For example, a DCI format 1_0 may indicate a PUCCH resource (for example, by an SRI field) that is activated for two spatial relation information 520 (because, for PUCCH, a MAC-CE may activate spatial relation information 520, beams 510, and uplink power control parameters). This differs from PUSCH-based examples, in which DCI dynamically indicates uplink beams and uplink power control parameters, and may result in the issue in which the DCI format 1_0 is able to indicate a PUCCH resource but unable to indicate for which closed-loop power control procedure to apply the single TPC value carried by the DCI format 1_0.

In some implementations, the UE 115-*d* may selectively apply the single TPC value provided by the scheduling DCI to one or both of the first closed-loop power control operation or the second closed-loop power control operation in accordance with a TPC command application rule in such scenarios in which a fallback DCI format indicates a PUCCH resource activated for two different spatial relation information 520 that each have different closed-loop power control operations (for example, different closed-loop power control index values). In some examples, and in accordance with the TPC command application rule, the UE 115-*d* may not expect such a scenario to occur and the UE 115-*d* may treat the DCI as an error case. For example, the UE 115-*d* may not expect a PUCCH resource indicator (PRI) field in a DCI format 1_0 to indicate a PUCCH resource that is associated with two active spatial relation information 520. In such examples, the UE 115-*d* may ignore the DCI and may refrain from applying the single TPC command to either of the closed-loop power control operations.

In some other examples, the UE 115-*d* may, in accordance with the TPC command application rule, apply the single TPC command indicated by the DCI to both the first closed-loop power control operation associated with the spatial relation information 520-*a* and the second closed-loop power control operation associated with the spatial relation information 520-*b*. In some other examples, the UE 115-*d* may, in accordance with the TPC command application rule, apply the TPC command to one of the first closed-loop power control operation or the second closed-loop power control operation in accordance with which of the closed-loop power control operations are associated with an index value of l=0, which of the closed-loop power control operations is activated first or earliest in MAC-CE, or which of the closed-loop power control operations is associated with an activated spatial relation information 520 in MAC-CE that has a lower spatial relation information identifier.

In some implementations, the UE 115-*d* may receive an indication of the TPC command application rule from the base station 105-*d*. Additionally or alternatively, the UE 115-*d* may follow the TPC command application rule in accordance with a (default) configuration (for example, the TPC command application rule may be specified by a standard). Additional details relating to such a TPC command application rule for scenarios in which a DCI indicates a PUCCH resource that is activated for two spatial relation information 520 and two closed-loop power control operations are illustrated by and described in more detail with reference to FIG. 6.

Figure 6:
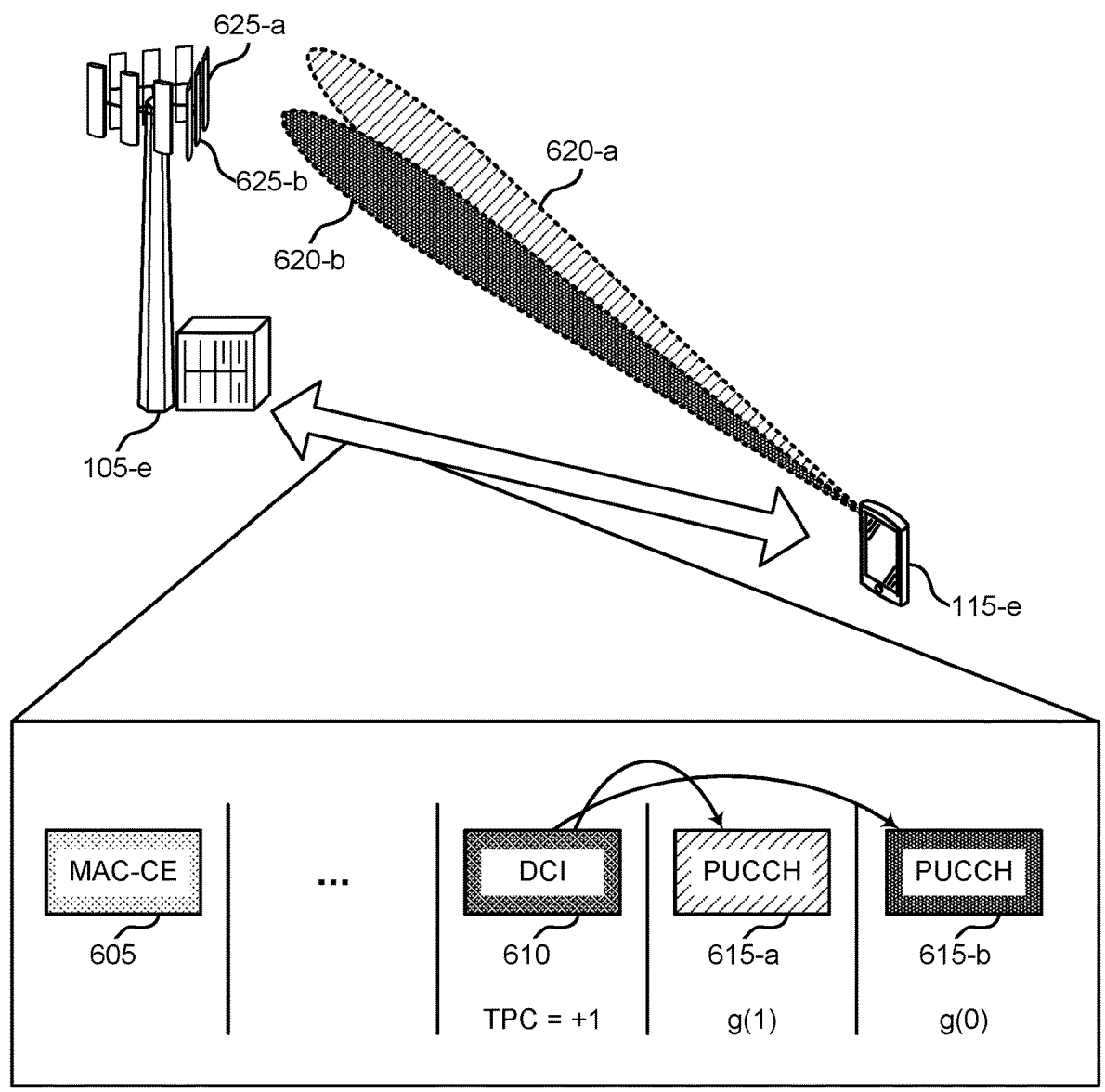

FIG. 6 illustrates an example of a wireless communications system 600 that supports uplink power control with fallback DCI in accordance with aspects of the present disclosure. The wireless communications system 600 may implement or be implemented to realize aspects of the wireless communications system 100, the wireless communications system 200, the wireless communications system 300, the wireless communications system 400, or the wireless communications system 500. For example, the wireless communications system 600 may include a UE 115-e and a base station 105-e (or one or more components of the base station 105-e), which may be examples of corresponding devices described herein, including with reference to FIGS. 1-5. In some examples, the UE 115-e may receive a DCI from the base station 105-e indicating a PUCCH resource that is activated for two spatial relation information 630, each spatial relation information 630 associated with a different closed-loop power control operation.

For example, the UE 115-e may receive, from the base station 105-e, a MAC-CE 605 activating a spatial relation information 630-a that is associated with a first closed-loop power control operation and a spatial relation information 630-b that is associated with a second closed-loop power control operation for a PUCCH resource over which the UE 115-e may be configured or schedule to transmit a PUCCH transmission 615. The 115-e may receive a DCI 610 from the base station 105-e indicating the PUCCH resource (for example, scheduling the PUCCH transmission 615 over the PUCCH resource) and, in some examples, the DCI 610 may have a fallback DCI format, such as a DCI format 1_0. In such examples, the DCI 610 may indicate the PUCCH resource via a PRI field but may lack a payload to be able to convey two different TPC values for the two different closed-loop power control operations associated with the PUCCH resource. Instead, the DCI 610 may indicate a single TPC command.

As shown in the wireless communications system 600, the PUCCH transmission 615 may include a PUCCH transmission 615-a over a first portion or instance of the PUCCH resource and the PUCCH transmission 615-a may be associated with the spatial relation information 630-a, a beam 620-a, and a closed-loop index value of l=1 (such that a closed-loop power adjustment state may be understood as g(1)). Similarly, the PUCCH transmission 615 may include a PUCCH transmission 615-b over a second portion or instance of the PUCCH resource and the PUCCH transmission 615-b may be associated with the spatial relation information 630-b, a beam 620-b, and a closed-loop index value of l=0 (such that a closed-loop power adjustment state may be understood as g(0)). In some examples, the UE 115-a may use the beam 620-a to transmit to a TRP 625-a associated with the base station 105-e and may use the beam 620-b to transmit to a TRP 625-b associated with the base station 105-e. In some aspects, the spatial relation information 630-a may be understood as or an example of a PUCCH-SpatialRelationInfoId=3 and the spatial relation information 630-b may be understood as or an example of a PUCCH-SpatialRelationInfoId=7. For explanatory purposes, it may be assumed that the closed-loop power adjustment states for both closed-loop indices are 0 prior to receiving the DCI 610. In other words, prior to receiving the DCI 610, g(1)=0 and g(0)=0. For similar explanatory reasons, the single TPC command indicated by the DCI 610 may be understood as +1.

As a result of receiving the DCI 610 indicating a PUCCH resource that is activated for two closed-loop power control operations and in scenarios in which the DCI 610 indicates a single TPC command, the UE 115-e may selectively apply the single TPC command to one or both of the first closed-loop power control operation or the second closed-loop power control operation in accordance with a TPC command application rule, as described with reference to FIG. 5. In some implementations, the UE 115-e may apply the single TPC command to both the first closed-loop power control operation and the second closed-loop power control operation. In such implementations, the UE 115-e may apply the single TPC command to both g(1) such that g(1)=+1 and g(0) such that g(0)=+1.

In some other implementations, the UE 115-a may apply the single TPC command to the second closed-loop power control operation as a result of the second closed-loop power control operation being associated with a closed-loop index value of l=0 and may refrain from applying the single TPC command to the first closed-loop power control operation. In such implementations, the UE 115-e may apply the single TPC command to g(0) such that g(0)=+1 and may refrain from applying the single TPC command to (1) such that g(1)=0. In some other implementations, the UE 115-a may apply the single TPC command to the closed-loop power control operation that is associated with a first or earliest activated spatial relation information 630 (in MAC-CE). In some examples, the base station 105-e may activate the spatial relation information 630-a prior to activating the spatial relation information 630-b and, in such examples, the UE 115-e may apply the single TPC command to g(1) such that g(1)=+1 and may refrain from applying the single TPC command to g(0) such that g(0)=0.

In some other implementations, the UE 115-e may apply the single TPC command to the closed-loop power control operation that is associated with a spatial relation information 630 having a relatively lower spatial relation information identifier. In some examples, the spatial relation information 630-a may be associated with a relatively lower spatial relation information identifier than the spatial relation information 630-b and, in such examples, the UE 115-e may apply the single TPC command to g(1) such that g(1)=+1 and may refrain from applying the single TPC command to g(0) such that g(0)=0.

Further, although FIG. 6 illustrates an example of scheme 1 PUCCH repetition, the UE 115-e may similarly apply the TPC command application rule in examples of any PUCCH repetitio scheme, including scheme 2 or scheme 3 PUCCH repetition, without exceeding the scope of the present disclosure.

Figure 7:
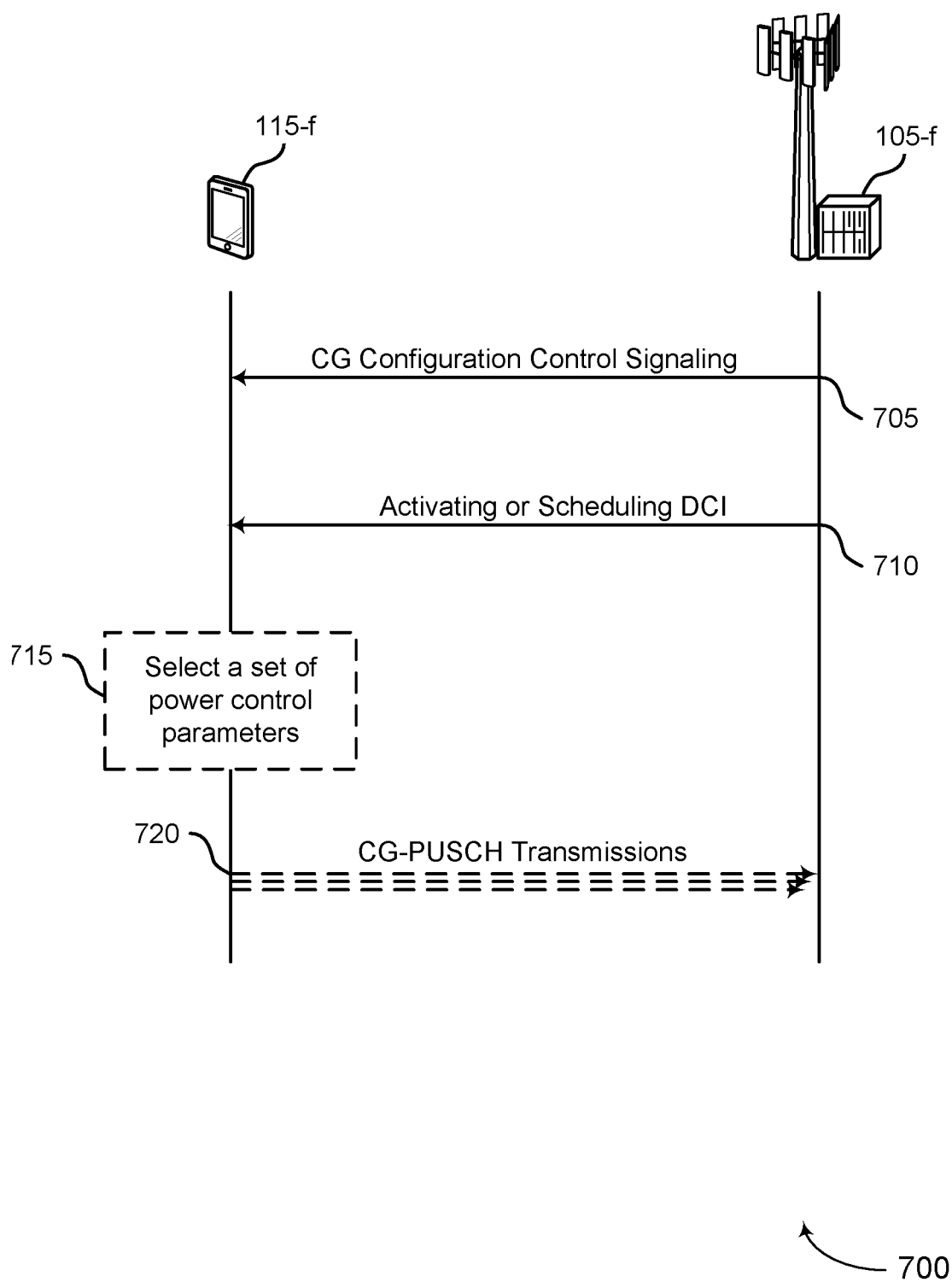
FIGS. 7 and 8 illustrate examples of process flows that support uplink power control with fallback DCI in accordance with aspects of the present disclosure.

FIG. 7 illustrates an example of a process flow 700 that supports uplink power control with fallback DCI in accordance with aspects of the present disclosure. The process flow 700 may implement or be implemented to realize aspects of the wireless communications systems described herein. For example, the process flow 700 illustrates communication between a UE 115-f and one or more components of a base station 105-f, which may be examples of corresponding devices described herein, including with reference to FIGS. 1-6. In some implementations, the UE 115-f may selectively transmit CG-PUSCH transmissions using a first set of power control parameters or a second set of power control parameters in accordance with a power control selection rule in scenarios in which CG transmissions are associated with multiple sets of power control parameters and in which an activating or scheduling DCI is unable to provide an indication of which set of power control parameters the UE 115-f is to use.

In the following description of the process flow 700, the operations may be performed (such as reported or provided) in a different order than the order shown, or the operations performed by the example devices may be performed in different orders or at different times. Some operations also may be left out of the process flow 700, or other operations may be added to the process flow 700. Further, although some operations or signaling may be shown to occur at different times for discussion purposes, these operations may actually occur at the same time.

At 705, the UE 115-*f* may receive, from the base station 105-*f*, control signaling indicating a first SRS resource set associated with a first set of power control parameters and a second SRS resource set associated with a second set of power control parameters and, in some examples, the first set of power control parameters and the second set of power control parameters may be configured for transmissions in a CG configuration. The base station 105-*f* may transmit such CG configuration control signaling to the UE 115-*f* via RRC signaling and may use the CG configuration control signaling to configure at least some transmission parameters that the UE 115-*f* may use for CG-PUSCH transmissions. In some examples, the base station 105-*f* may indicate whether the CG-PUSCH transmissions are associated with a Type 1 CG or a Type 2 CG. Additional details relating to such CG configuration control signaling are described herein, including with reference to FIGS. 2 and 3.

At 710, the UE 115-*f* may receive, from the base station 105-*f*, DCI for the CG-PUSCH. The DCI may be an example of an activating DCI (for Type 2 CG-PUSCH) or a scheduling DCI (for a retransmission of a Type 1 CG-PUSCH or a Type 2 CG-PUSCH) and, in some examples, may have a fallback DCI format. For example, the DCI may have a DCI format 0_0. In such examples in which the DCI has a DCI format 0_0, the base station 105-*f* may be unable to convey, to the UE 115-*f*, which of the two SRS resource sets (and which of the associated sets of power control parameters) the UE 115-*f* is to use for the CG-PUSCH.

At 715, the UE 115-*f* may, in some examples, select a set of power control parameters for the CG-PUSCH in accordance with a power control selection rule in such scenarios in which the activating or scheduling DCI is unable to indicate or distinguish between two configured SRS resource sets and two associated configured sets of power control parameters. In some implementations, the power control selection rule may define that the first set of power control parameters are to be used for the CG-PUSCH (for example, as a default in such scenarios). In some other implementations, the power control selection rule may define receiving the DCI format 0_0 for a CG-PUSCH that is configured with multiple sets of power control parameters as an error case and, in such implementations, the UE 115-*f* may refrain from selecting either of the sets of power control parameters (and may refrain from transmitting the CG-PUSCH transmissions). In some other implementations, the UE 115-*f* may receive additional signaling (for example, RRC signaling) indicating that one of the two sets of power control parameters are to be used in such scenarios and the UE 115-*f* may select the indicated set of power control parameters.

In some implementations, the UE 115-*f* may receive an indication of the power control selection rule from the base station 105-*f*. Additionally or alternatively, the UE 115-*f* may follow the power control selection rule in accordance with a (default) configuration (for example, the power control selection rule may be specified by a standard).

At 720, the UE 115-*f* may selectively transmit, to the base station 105-*f* and in accordance with the power control selection rule and based on the DCI having the fallback DCI format 0_0, over the CG-PUSCH using one of the first set of power control parameters or the second set of power control parameters. For example, in accordance with the selection at 715, the UE 115-*f* may transmit the CG-PUSCH transmissions using the first set of power control parameters or using the second set of power control parameters or may refrain from transmitting the CG-PUSCH transmissions.

Figure 8:
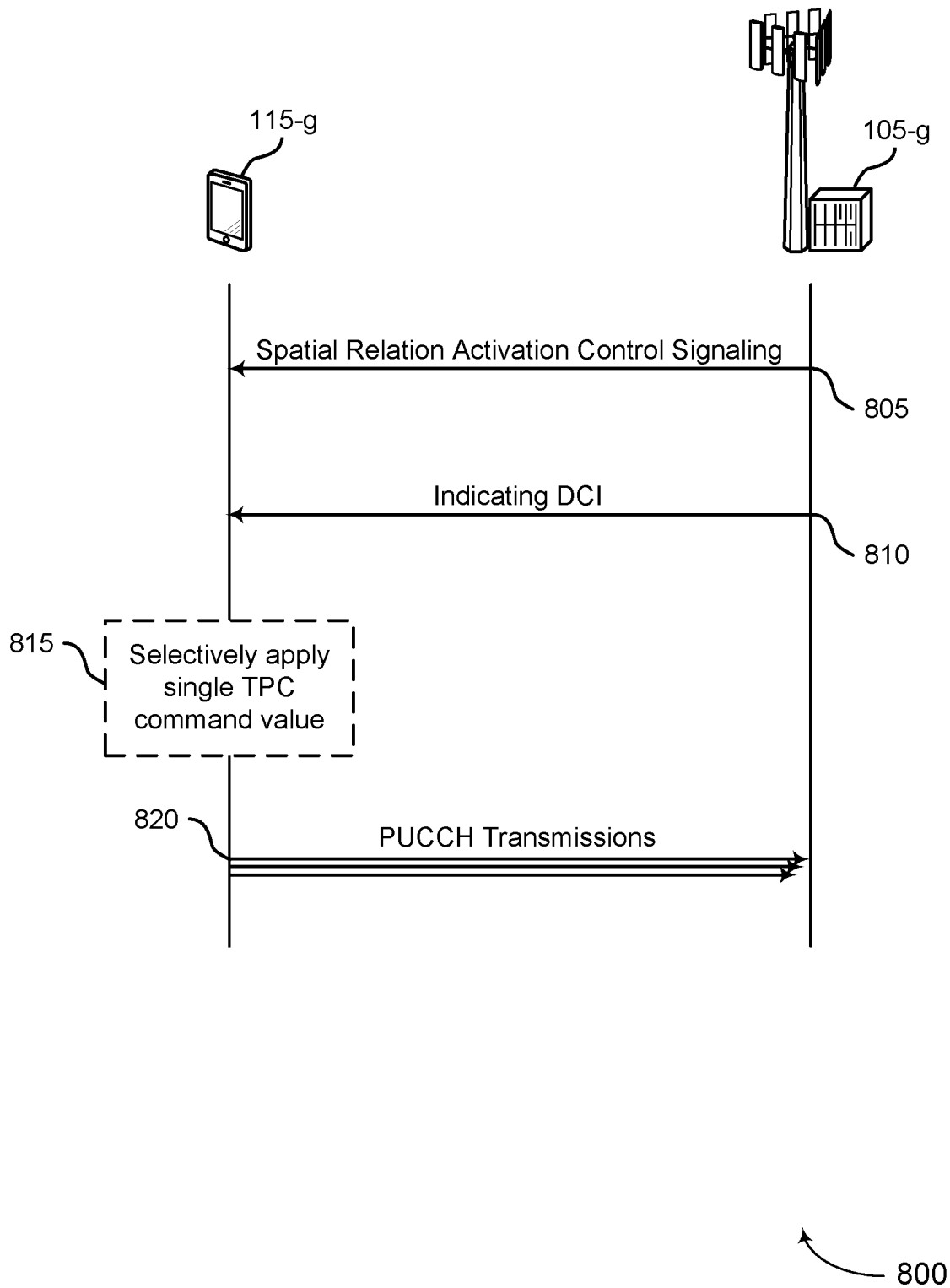

FIG. 8 illustrates an example of a process flow 800 that supports uplink power control with fallback DCI in accordance with aspects of the present disclosure. The process flow 800 may implement or be implemented to realize aspects of the wireless communications systems described herein. For example, the process flow 800 illustrates communication between a UE 115-*g* and one or more components of a base station 105-*g*, which may be examples of corresponding devices described herein, including with reference to FIGS. 1-6. In some implementations, the UE 115-*g* may selectively apply a single TPC command indicated by a DCI to one or both of two closed-loop power control operations associated with PUCCH transmissions in accordance with a TPC command application rule in scenarios in which an indicated PUCCH resource is associated with multiple spatial relation information identifiers, each spatial relation information identifier being associated with a different closed-loop power control operation.

In the following description of the process flow 800, the operations may be performed (such as reported or provided) in a different order than the order shown, or the operations performed by the example devices may be performed in different orders or at different times. Some operations also may be left out of the process flow 800, or other operations may be added to the process flow 800. Further, although some operations or signaling may be shown to occur at different times for discussion purposes, these operations may actually occur at the same time.

At 805, the UE 115-*g* may receive, from the base station 105-*g*, control signaling activating, for a PUCCH resource, a first spatial relation associated with a first closed-loop power control operation and a second spatial relation associated with a second closed-loop power control operation. In some examples, the UE 115-*g* may receive such spatial relation activation control signaling from the base station 105-*g* via one or multiple MAC-CEs.

At 810, the UE 115-*g* may receive, from the base station 105-*g*, DCI indicating a single TPC command for the PUCCH resource. For example, the DCI may have a fallback DCI format, such as a DCI format 1_0, and may carry a payload sufficient for indicating a single TPC command. In such examples, the base station 105-*g* may be unable to convey to which closed-loop power control operation the UE 115-*g* is to apply the single TPC command in such scenarios in which the indicated PUCCH resource is activated for multiple closed-loop power control operations.

At 815, the UE 115-*g* may selectively apply the single TPC command to one or both of the first closed-loop power control operation or the second closed-loop power control operation in accordance with a TPC command application rule and based on receiving the DCI indicating the single TPC command in scenarios in which the indicated PUCCH resource is activated for multiple closed-loop power control procedures. In some implementations, the TPC command application rule may define the receiving of the DCI indicating the single TPC command for the PUCCH resource activated for the multiple closed-loop power control procedures as an error case and, in such implementations, the UE 115-*g* may refrain from applying the single TPC command to either closed-loop power control operation. In some other implementations, the TPC command application rule may define that the UE 115-*g* is to apply the single TPC command to both closed-loop power control operations. In some other implementations, the TPC command application rule may define that the UE 115-*g* is to apply the single TPC command to one of the closed-loop power control operations based on which closed-loop power control operation is associated with a relatively lower closed-loop power control index, based on which closed-loop power control operation is associated with an earlier activated spatial relation, or based on which closed-loop power control operation is associated with a relatively lower spatial relation information identifier.

In some implementations, the UE 115-*g* may receive an indication of the TPC command application rule from the base station 105-*g*. Additionally or alternatively, the UE 115-*g* may follow the TPC command application rule in accordance with a (default) configuration (for example, the TPC command application rule may be specified by a standard).

At 820, the UE 115-*g* may transmit, to the base station 105-*g*, over the PUCCH resource based on the DCI and one or both of the first closed-loop power control operation or the second closed-loop power control operation. For example, the UE 115-*g* may transmit PUCCH transmissions (which may include a number of repetitions of a same UCI) over the PUCCH resource using one or both of the first closed-loop power control operation or the second closed-loop power control operation and in accordance with selectively applying the single TPC command at 815.

Figure 9:
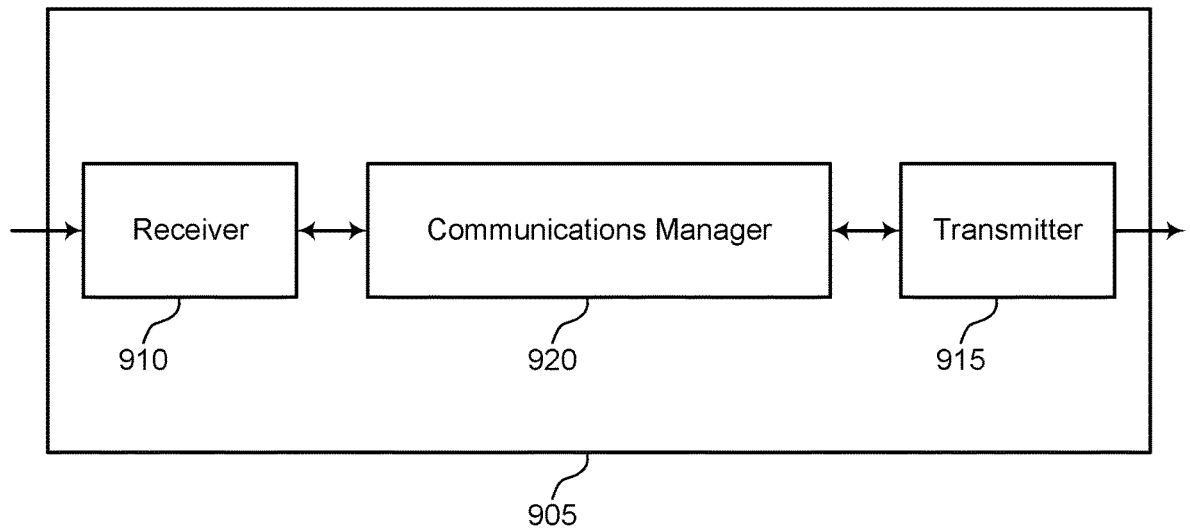
FIGS. 9 and 10 show block diagrams of devices that support uplink power control with fallback DCI in accordance with aspects of the present disclosure.

FIG. 9 shows a block diagram of a device 905 that supports uplink power control with fallback DCI in accordance with aspects of the present disclosure. The device 905 may be an example of aspects of a UE 115. The device 905 may include a receiver 910, a transmitter 915, and a communications manager 920. The communications manager 920 can be implemented, at least in part, by one or both of a modem and a processor. Each of these components may be in communication with one another (for example, via one or more buses).

The receiver 910 may provide a means for receiving information such as packets, user data, control information, or any combination thereof associated with various information channels (for example, control channels, data channels, information channels related to uplink power control with fallback DCI). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (for example, control channels, data channels, information channels related to uplink power control with fallback DCI). In some examples, the transmitter 915 may be co-located with a receiver 910 in a transceiver component. The transmitter 915 may utilize a single antenna or a set of multiple antennas.

The communications manager 920, the receiver 910, the transmitter 915, or various combinations thereof or various components thereof may be examples of means for performing various aspects of uplink power control with fallback DCI. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (for example, in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (for example, by executing, by the processor, instructions stored in the memory).

In some examples, the communications manager 920 may be configured to perform various operations (for example, receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations.

The communications manager 920 may support wireless communication at a UE in accordance with examples as disclosed herein. For example, the communications manager 920 may be configured as or otherwise support a means for receiving control signaling indicating a first SRS resource set associated with a first set of power control parameters and a second SRS resource set associated with a second set of power control parameters, the first set of power control parameters and the second set of power control parameters for transmissions in a CG configuration. The communications manager 920 may be configured as or otherwise support a means for receiving DCI for a CG uplink shared channel. The communications manager 920 may be configured as or otherwise support a means for selectively transmitting, based on a format of the DCI, over the CG uplink shared channel using one of the first set of power control parameters or the second set of power control parameters.

Additionally or alternatively, the communications manager 920 may support wireless communication at a UE in accordance with examples as disclosed herein. For example, the communications manager 920 may be configured as or otherwise support a means for receiving control signaling activating, for an uplink control channel resource, a first spatial relation associated with a first closed-loop power control operation and a second spatial relation associated with a second closed-loop power control operation. The communications manager 920 may be configured as or otherwise support a means for receiving DCI indicating a single TPC command for the uplink control channel resource. The communications manager 920 may be configured as or otherwise support a means for selectively applying the single TPC command to one or both of the first closed-loop power control operation or the second closed-loop power control operation based on receiving the DCI. The communications manager 920 may be configured as or otherwise support a means for transmitting over the uplink control channel resource based on the DCI and one or both of the first closed-loop power control operation or the second closed-loop power control operation.

By including or configuring the communications manager 920 in accordance with examples as described with reference to FIGS. 1-8, the device 905 (for example, a processor controlling or otherwise coupled to the receiver 910, the transmitter 915, the communications manager 920, or a combination thereof) may support techniques for reduced processing, reduced power consumption, and more efficient utilization of communication resources.

Figure 10:
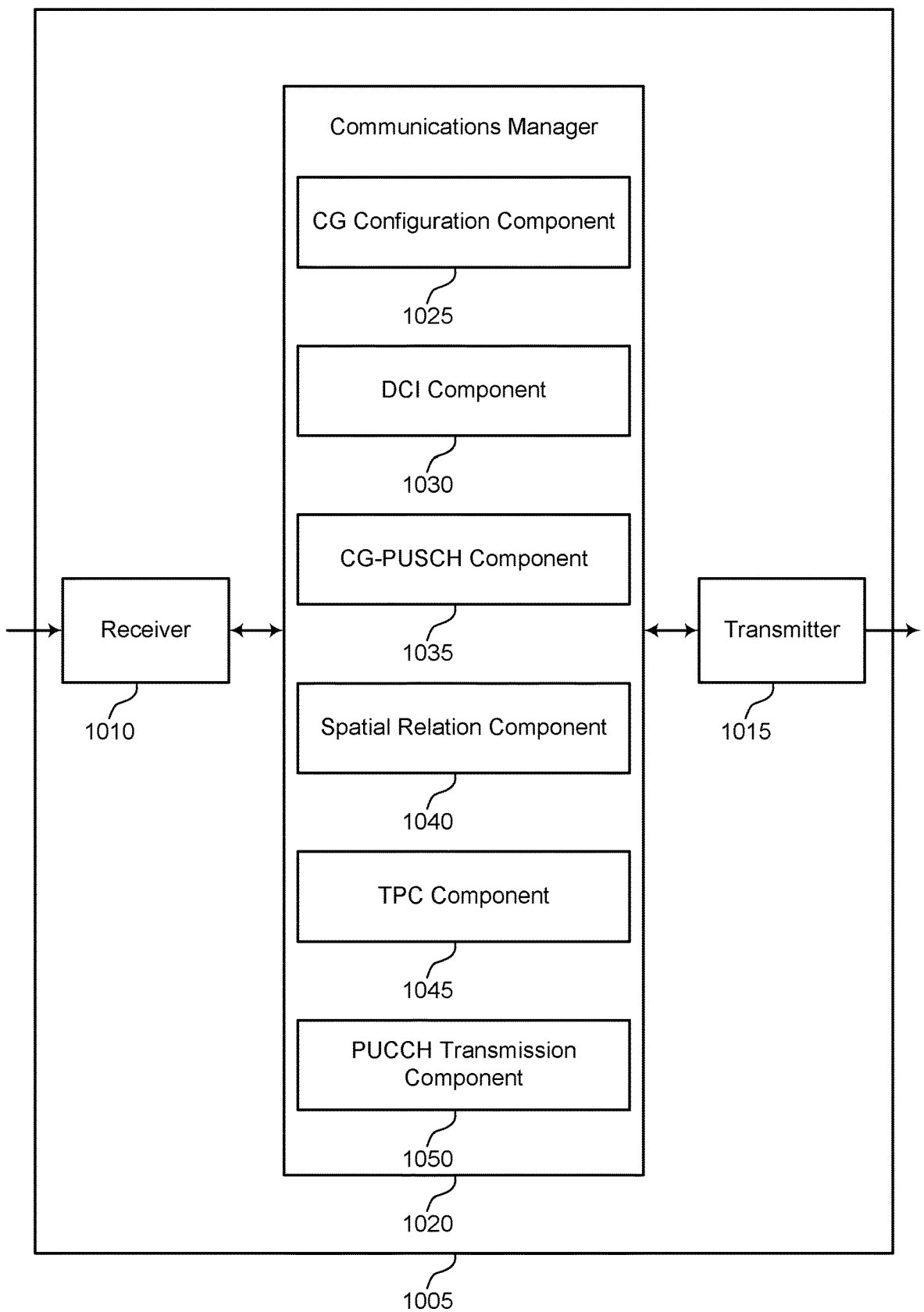

FIG. 10 shows a block diagram of a device 1005 that supports uplink power control with fallback DCI in accordance with aspects of the present disclosure. The device 1005 may be an example of aspects of a device 905 or a UE 115. The device 1005 may include a receiver 1010, a transmitter 1015, and a communications manager 1020. The communications manager 1020 can be implemented, at least in part, by one or both of a modem and a processor. Each of these components may be in communication with one another (for example, via one or more buses).

The receiver 1010 may provide a means for receiving information such as packets, user data, control information, or any combination thereof associated with various information channels (for example, control channels, data channels, information channels related to uplink power control with fallback DCI). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (for example, control channels, data channels, information channels related to uplink power control with fallback DCI). In some examples, the transmitter 1015 may be co-located with a receiver 1010 in a transceiver component. The transmitter 1015 may utilize a single antenna or a set of multiple antennas.

The device 1005, or various components thereof, may be an example of means for performing various aspects of uplink power control with fallback DCI. For example, the communications manager 1020 may include a CG configuration component 1025, a DCI component 1030, a CG-PUSCH component 1035, a spatial relation component 1040, a TPC component 1045, a PUCCH transmission component 1050, or any combination thereof. In some examples, the communications manager 1020, or various components thereof, may be configured to perform various operations (for example, receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations.

The communications manager 1020 may support wireless communication at a UE in accordance with examples as disclosed herein. The CG configuration component 1025 may be configured as or otherwise support a means for receiving control signaling indicating a first SRS resource set associated with a first set of power control parameters and a second SRS resource set associated with a second set of power control parameters, the first set of power control parameters and the second set of power control parameters for transmissions in a CG configuration. The DCI component 1030 may be configured as or otherwise support a means for receiving DCI for a CG uplink shared channel. The CG-PUSCH component 1035 may be configured as or otherwise support a means for selectively transmitting, based on a format of the DCI, over the CG uplink shared channel using one of the first set of power control parameters or the second set of power control parameters.

Additionally or alternatively, the communications manager 1020 may support wireless communication at a UE in accordance with examples as disclosed herein. The spatial relation component 1040 may be configured as or otherwise support a means for receiving control signaling activating, for an uplink control channel resource, a first spatial relation associated with a first closed-loop power control operation and a second spatial relation associated with a second closed-loop power control operation. The DCI component 1030 may be configured as or otherwise support a means for receiving DCI indicating a single TPC command for the uplink control channel resource. The TPC component 1045 may be configured as or otherwise support a means for selectively applying the single TPC command to one or both of the first closed-loop power control operation or the second closed-loop power control operation based on receiving the DCI. The PUCCH transmission component 1050 may be configured as or otherwise support a means for transmitting over the uplink control channel resource based on the DCI and one or both of the first closed-loop power control operation or the second closed-loop power control operation.

Figure 11:
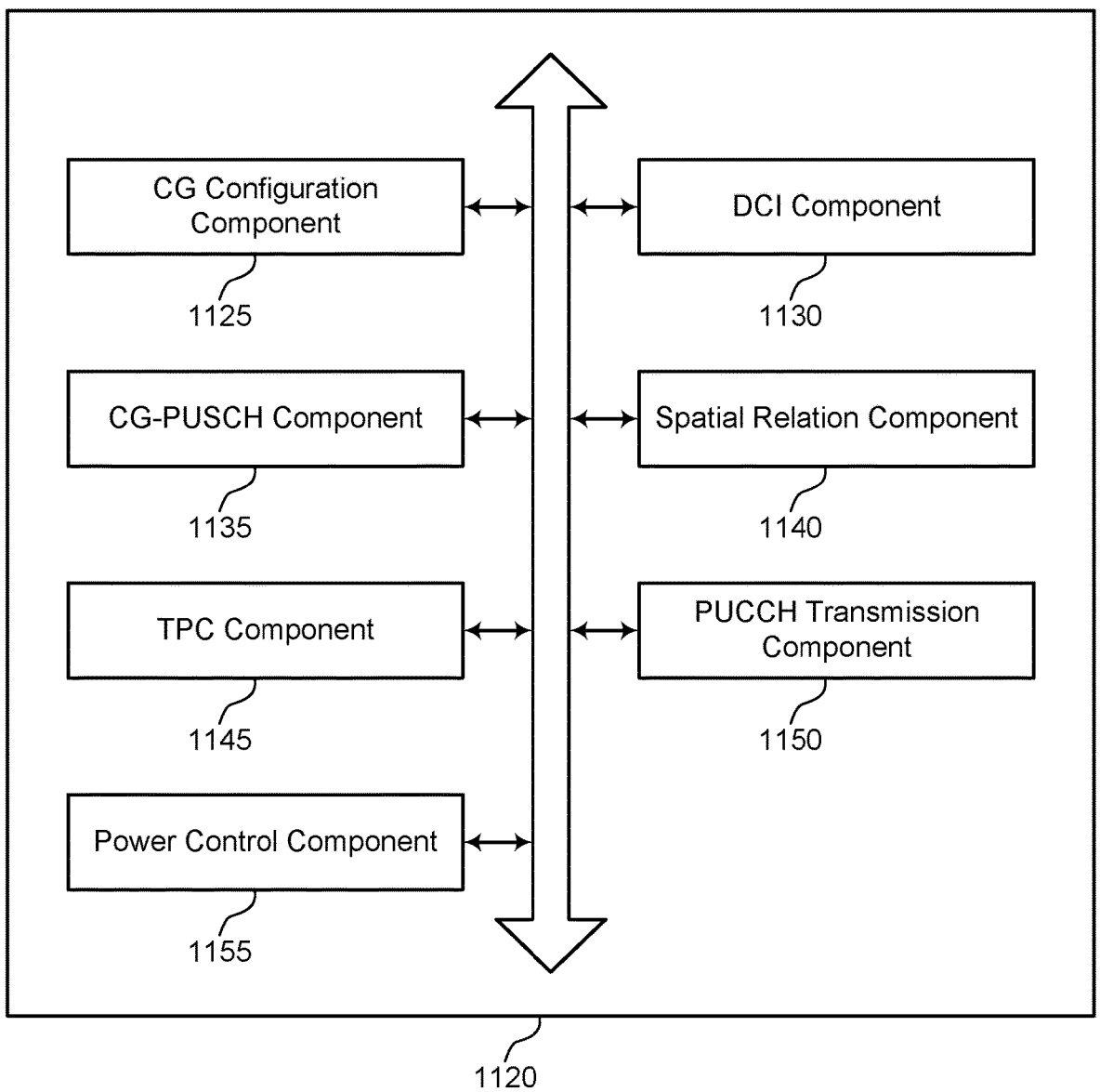
FIG. 11 shows a block diagram of a communications manager that supports uplink power control with fallback DCI in accordance with aspects of the present disclosure.

FIG. 11 shows a block diagram of a communications manager 1120 that supports uplink power control with fallback DCI in accordance with aspects of the present disclosure. The communications manager 1120, or various components thereof, may be an example of means for performing various aspects of uplink power control with fallback DCI. For example, the communications manager 1120 may include a CG configuration component 1125, a DCI component 1130, a CG-PUSCH component 1135, a spatial relation component 1140, a TPC component 1145, a PUCCH transmission component 1150, a power control component 1155, or any combination thereof. Each of these components may communicate, directly or indirectly, with one another (for example, via one or more buses).

The communications manager 1120 may support wireless communication at a UE in accordance with examples as disclosed herein. The CG configuration component 1125 may be configured as or otherwise support a means for receiving control signaling indicating a first SRS resource set associated with a first set of power control parameters and a second SRS resource set associated with a second set of power control parameters, the first set of power control parameters and the second set of power control parameters for transmissions in a CG configuration. The DCI component 1130 may be configured as or otherwise support a means for receiving DCI for a CG uplink shared channel. The CG-PUSCH component 1135 may be configured as or otherwise support a means for selectively transmitting, based on a format of the DCI, over the CG uplink shared channel using one of the first set of power control parameters or the second set of power control parameters.

In some examples, to support selectively transmitting over the CG uplink shared channel using one of the first set of power control parameters or the second set of power control parameters, the CG-PUSCH component 1135 may be configured as or otherwise support a means for transmitting over the CG uplink shared channel using the first set of power control parameters based on multiple sets of power control parameters being usable for the transmissions in the CG configuration and the first set of power control parameters occupying a first set of radio resource control fields prior to a second set of radio resource control fields occupied by the second set of power control parameters.

In some examples, to support selectively transmitting over the CG uplink shared channel using one of the first set of power control parameters or the second set of power control parameters, the CG-PUSCH component 1135 may be configured as or otherwise support a means for refraining from transmitting over the CG uplink shared channel based on the format of the DCI.

In some examples, the CG-PUSCH component 1135 may be configured as or otherwise support a means for identifying an error case based on multiple sets of power control parameters being usable for the transmissions in the CG configuration and the format of the DCI.

In some examples, the power control component 1155 may be configured as or otherwise support a means for receiving signaling indicating that one of the first set of power control parameters or the second set of power control parameters is to be used for CG uplink shared channel transmissions that are scheduled by the DCI. In some examples, selectively transmitting over the CG uplink shared channel is based on receiving the signaling.

In some examples, to support selectively transmitting over the CG uplink shared channel using one of the first set of power control parameters or the second set of power control parameters, the CG-PUSCH component 1135 may be configured as or otherwise support a means for transmitting over the CG uplink shared channel using the one of the first set of power control parameters or the second set of power control parameters based on receiving the signaling.

In some examples, the power control component 1155 may be configured as or otherwise support a means for receiving radio resource control signaling indicating a first path loss compensation factor and a first power control loop index for the first set of power control parameters and a second path loss compensation factor and a second power control loop index for the second set of power control parameters, In some examples, the first SRS resource set is associated with the first path loss compensation factor and the first power control loop index and the second SRS resource set is associated with the second path loss compensation factor and the second power control loop index.

In some examples, the DCI activates the CG uplink shared channel. In some examples, the CG uplink shared channel includes a Type 2 CG uplink shared channel.

In some examples, the DCI schedules a retransmission for the CG uplink shared channel. In some examples, the CG uplink shared channel includes a Type 1 CG uplink shared channel or a Type 2 CG uplink shared channel.

In some examples, the format of the DCI includes a fallback DCI format. In some examples, the fallback DCI format includes a DCI format 0_0.

In some examples, the first SRS resource set and the first set of power control parameters are associated with communication with a first transmission and reception point and the second SRS resource set and the second set of power control parameters are associated with communication with a second transmission and reception point.

Additionally or alternatively, the communications manager 1120 may support wireless communication at a UE in accordance with examples as disclosed herein. The spatial relation component 1140 may be configured as or otherwise support a means for receiving control signaling activating, for an uplink control channel resource, a first spatial relation associated with a first closed-loop power control operation and a second spatial relation associated with a second closed-loop power control operation. In some examples, the DCI component 1130 may be configured as or otherwise support a means for receiving DCI indicating a single TPC command for the uplink control channel resource. The TPC component 1145 may be configured as or otherwise support a means for selectively applying the single TPC command to one or both of the first closed-loop power control operation or the second closed-loop power control operation based on receiving the DCI. The PUCCH transmission component 1150 may be configured as or otherwise support a means for transmitting over the uplink control channel resource based on the DCI and one or both of the first closed-loop power control operation or the second closed-loop power control operation.

In some examples, to support selectively applying the single TPC command to one or both of the first closed-loop power control operation or the second closed-loop power control operation, the TPC component 1145 may be configured as or otherwise support a means for refraining from applying the single TPC command to the first closed-loop power control operation and the second closed-loop power control operation based on the DCI indicating the single TPC command for the uplink control channel resource.

In some examples, the TPC component 1145 may be configured as or otherwise support a means for identifying an error case based on both the first spatial relation and the second spatial relation being activated for the uplink control channel resource and based on the DCI indicating the single TPC command.

In some examples, to support selectively applying the single TPC command to one or both of the first closed-loop power control operation or the second closed-loop power control operation, the TPC component 1145 may be configured as or otherwise support a means for applying the single TPC command to the first closed-loop power control operation and the second closed-loop power control operation based on the DCI indicating the single TPC command for the uplink control channel resource.

In some examples, to support selectively applying the single TPC command to one or both of the first closed-loop power control operation or the second closed-loop power control operation, the TPC component 1145 may be configured as or otherwise support a means for applying the TPC command exclusively to the first closed-loop power control operation based on the DCI indicating the single TPC command for the uplink control channel resource and the first closed-loop power control operation having a relatively lower closed-loop power control index than the second closed-loop power control operation.

In some examples, to support selectively applying the single TPC command to one or both of the first closed-loop power control operation or the second closed-loop power control operation, the TPC component 1145 may be configured as or otherwise support a means for applying the TPC command exclusively to the first closed-loop power control operation based on the DCI indicating the single TPC command for the uplink control channel resource and the first spatial relation associated with the first closed-loop power control operation being activated relatively earlier than the second spatial relation associated with the second closed-loop power control operation.

In some examples, to support selectively applying the single TPC command to one or both of the first closed-loop power control operation or the second closed-loop power control operation, the TPC component 1145 may be configured as or otherwise support a means for applying the TPC command exclusively to the first closed-loop power control operation based on the DCI indicating the single TPC command for the uplink control channel resource and the first spatial relation associated with the first closed-loop power control operation having a relatively lower spatial relation information identifier than the second spatial relation associated with the second closed-loop power control operation.

In some examples, the DCI has a fallback DCI format. In some examples, the fallback DCI format includes a DCI format 1_0.

In some examples, the first spatial relation and the first closed-loop power control operation are associated with communication with a first transmission and reception point and the second spatial relation and the second closed-loop power control operation are associated with communication with a second transmission and reception point.

Figure 12:
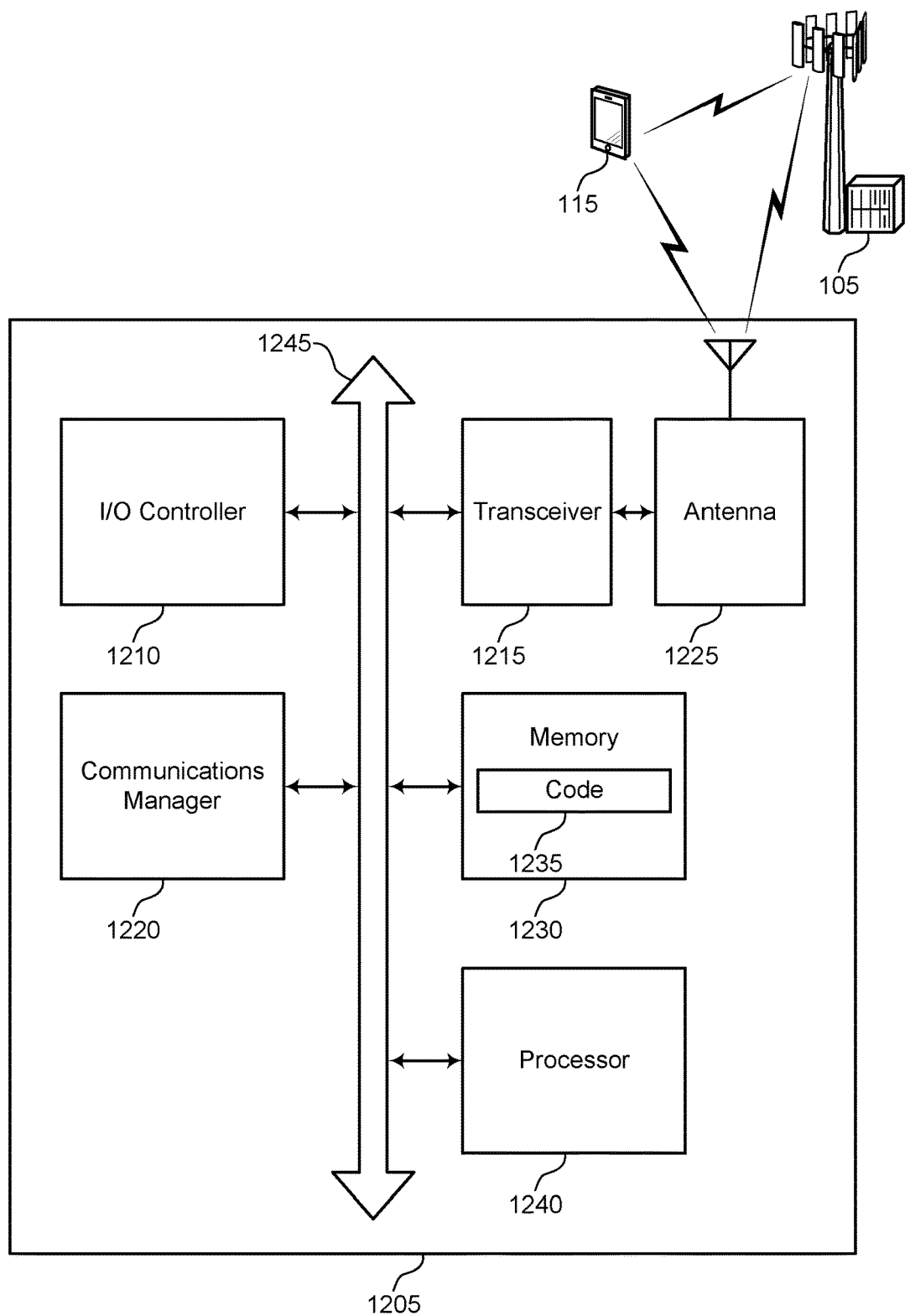
FIG. 12 shows a diagram of a system including a device that supports uplink power control with fallback DCI in accordance with aspects of the present disclosure.

FIG. 12 shows a diagram of a system including a device 1205 that supports uplink power control with fallback DCI in accordance with aspects of the present disclosure. The device 1205 may be an example of or include the components of a device 905, a device 1005, or a UE 115. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (for example, operatively, communicatively, functionally, electronically, electrically) via one or more buses (for example, a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (for example, when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (for example, the memory 1230) to cause the device 1205 to perform various functions (for example, functions or tasks supporting uplink power control with fallback DCI). For example, the device 1205 or a component of the device 1205 may include a processor 1240 and memory 1230 coupled to the processor 1240, the processor 1240 and memory 1230 configured to perform various functions described herein.

The communications manager 1220 may support wireless communication at a UE in accordance with examples as disclosed herein. For example, the communications manager 1220 may be configured as or otherwise support a means for receiving control signaling indicating a first SRS resource set associated with a first set of power control parameters and a second SRS resource set associated with a second set of power control parameters, the first set of power control parameters and the second set of power control parameters for transmissions in a CG configuration. The communications manager 1220 may be configured as or otherwise support a means for receiving DCI for a CG uplink shared channel. The communications manager 1220 may be configured as or otherwise support a means for selectively transmitting, based on a format of the DCI, over the CG uplink shared channel using one of the first set of power control parameters or the second set of power control parameters.

Additionally or alternatively, the communications manager 1220 may support wireless communication at a UE in accordance with examples as disclosed herein. For example, the communications manager 1220 may be configured as or otherwise support a means for receiving control signaling activating, for an uplink control channel resource, a first spatial relation associated with a first closed-loop power control operation and a second spatial relation associated with a second closed-loop power control operation. The communications manager 1220 may be configured as or otherwise support a means for receiving DCI indicating a single TPC command for the uplink control channel resource. The communications manager 1220 may be configured as or otherwise support a means for selectively applying the single TPC command to one or both of the first closed-loop power control operation or the second closed-loop power control operation based on receiving the DCI. The communications manager 1220 may be configured as or otherwise support a means for transmitting over the uplink control channel resource based on the DCI and one or both of the first closed-loop power control operation or the second closed-loop power control operation.

By including or configuring the communications manager 1220 in accordance with examples described with reference to FIGS. 1-8, the device 1205 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1220 may be configured to perform various operations (for example, receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of uplink power control with fallback DCI, or the processor 1240 and the memory 1230 may be otherwise configured to perform or support such operations.

Figure 13:
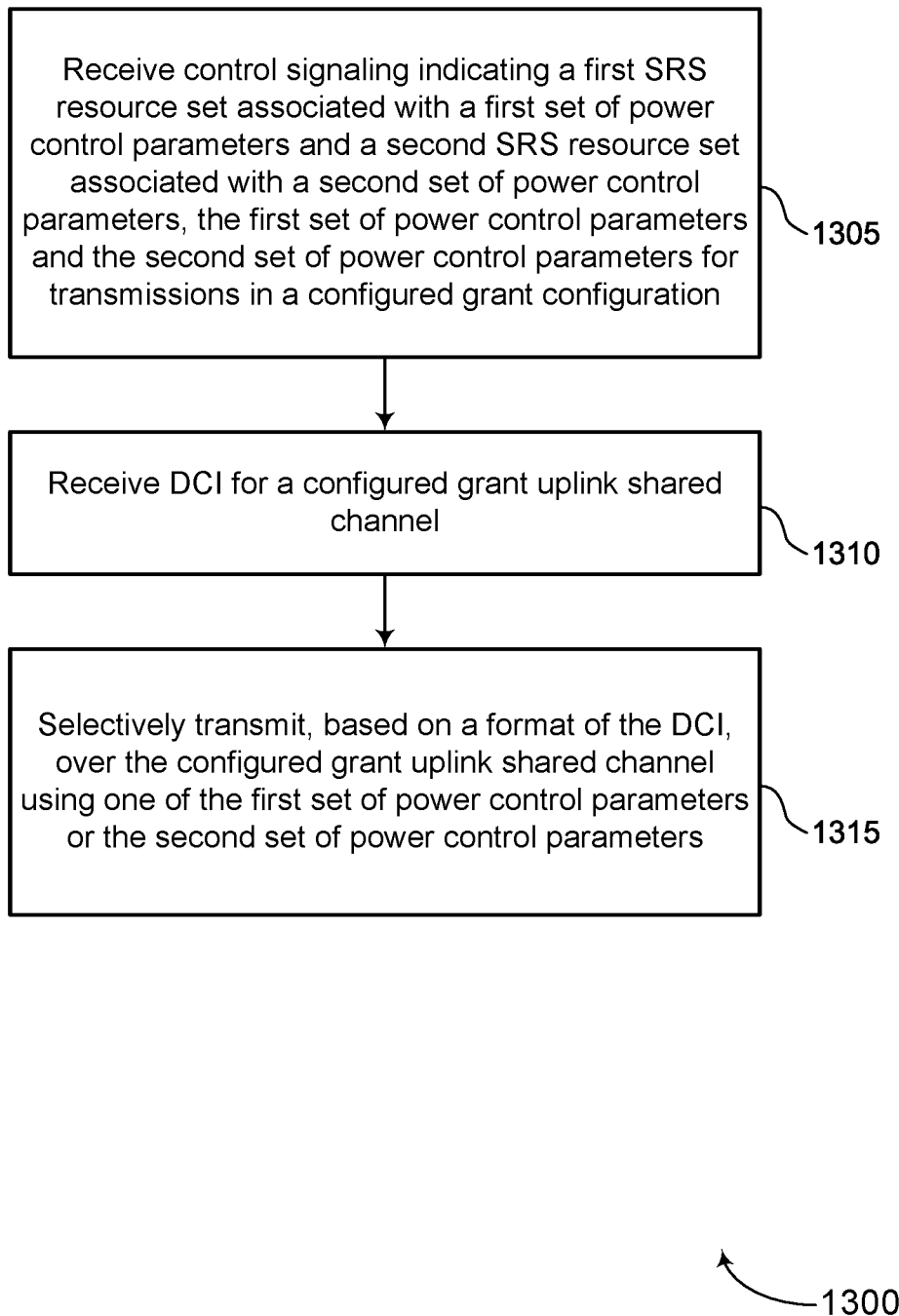
FIGS. 13 and 14 show flowcharts illustrating methods that support uplink power control with fallback DCI in accordance with aspects of the present disclosure.

FIG. 13 shows a flowchart illustrating a method 1300 that supports uplink power control with fallback DCI in accordance with aspects of the present disclosure. The operations of the method 1300 may be implemented by a UE or its components. For example, the operations of the method 1300 may be performed by a UE 115 as described with reference to FIGS. 1-12. In some examples, a UE may execute a set of instructions to control the functional elements of the UE to perform the described functions. Additionally or alternatively, the UE may perform aspects of the described functions using special-purpose hardware.

At 1305, the method may include receiving control signaling indicating a first SRS resource set associated with a first set of power control parameters and a second SRS resource set associated with a second set of power control parameters, the first set of power control parameters and the second set of power control parameters for transmissions in a CG configuration. The operations of 1305 may be performed in accordance with examples as disclosed herein. In some examples, aspects of the operations of 1305 may be performed by a CG configuration component 1125 as described with reference to FIG. 11.

At 1310, the method may include receiving DCI for a CG uplink shared channel. The operations of 1310 may be performed in accordance with examples as disclosed herein. In some examples, aspects of the operations of 1310 may be performed by a DCI component 1130 as described with reference to FIG. 11.

At 1315, the method may include selectively transmitting, based on a format of the DCI, over the CG uplink shared channel using one of the first set of power control parameters or the second set of power control parameters. The operations of 1315 may be performed in accordance with examples as disclosed herein. In some examples, aspects of the operations of 1315 may be performed by a CG-PUSCH component 1135 as described with reference to FIG. 11.

Figure 14:
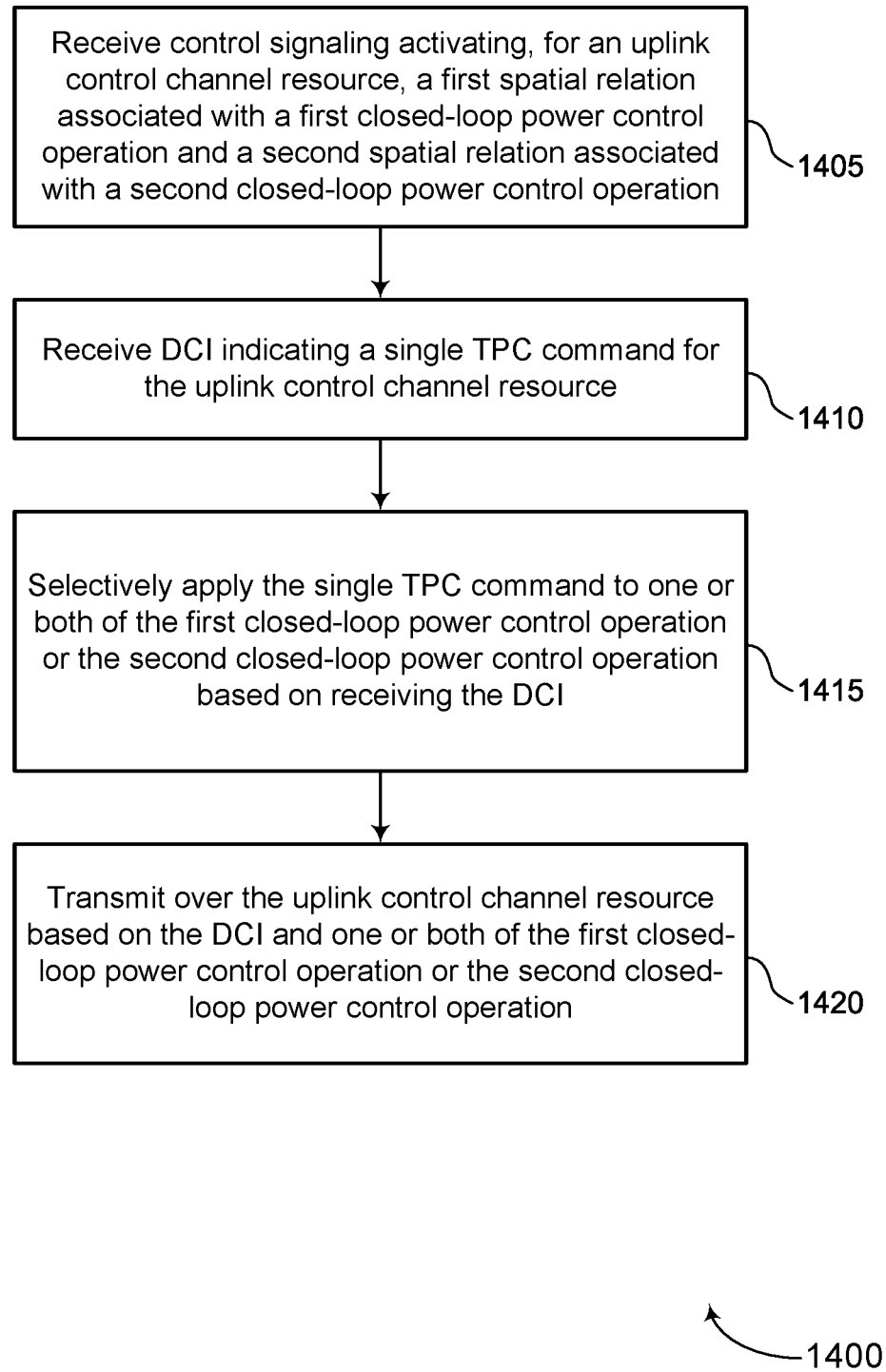

FIG. 14 shows a flowchart illustrating a method 1400 that supports uplink power control with fallback DCI in accordance with aspects of the present disclosure. The operations of the method 1400 may be implemented by a UE or its components. For example, the operations of the method 1400 may be performed by a UE 115 as described with reference to FIGS. 1-12. In some examples, a UE may execute a set of instructions to control the functional elements of the UE to perform the described functions. Additionally or alternatively, the UE may perform aspects of the described functions using special-purpose hardware.

At 1405, the method may include receiving control signaling activating, for an uplink control channel resource, a first spatial relation associated with a first closed-loop power control operation and a second spatial relation associated with a second closed-loop power control operation. The operations of 1405 may be performed in accordance with examples as disclosed herein. In some examples, aspects of the operations of 1405 may be performed by a spatial relation component 1140 as described with reference to FIG. 11.

At 1410, the method may include receiving DCI indicating a single TPC command for the uplink control channel resource. The operations of 1410 may be performed in accordance with examples as disclosed herein. In some examples, aspects of the operations of 1410 may be performed by a DCI component 1130 as described with reference to FIG. 11.

At 1415, the method may include selectively applying the single TPC command to one or both of the first closed-loop power control operation or the second closed-loop power control operation based on receiving the DCI. The operations of 1415 may be performed in accordance with examples as disclosed herein. In some examples, aspects of the operations of 1415 may be performed by a TPC component 1145 as described with reference to FIG. 11.

At 1420, the method may include transmitting over the uplink control channel resource based on the DCI and one or both of the first closed-loop power control operation or the second closed-loop power control operation. The operations of 1420 may be performed in accordance with examples as disclosed herein. In some examples, aspects of the operations of 1420 may be performed by a PUCCH transmission component 1150 as described with reference to FIG. 11.

The following provides an overview of aspects of the present disclosure:

Aspect 1: A method for wireless communication at a UE, comprising: receiving control signaling indicating a first sounding reference signal resource set associated with a first set of power control parameters and a second sounding reference signal resource set associated with a second set of power control parameters, the first set of power control parameters and the second set of power control parameters for transmissions in a configured grant configuration; receiving downlink control information for a configured grant uplink shared channel, the downlink control information having a format; and selectively transmitting, in accordance with a power control selection and based at least in part on the downlink control information having the format, over the configured grant uplink shared channel using one of the first set of power control parameters or the second set of power control parameters.

Aspect 2: The method of aspect 1, wherein selectively transmitting over the configured grant uplink shared channel using one of the first set of power control parameters or the second set of power control parameters comprises: transmitting over the configured grant uplink shared channel using the first set of power control parameters in accordance with the power control selection and based at least in part on the downlink control information having the format, wherein the power control selection is associated with the first set of power control parameters being used for configured grant uplink shared channel transmissions that are scheduled by the downlink control information having the format based at least in part on multiple sets of power control parameters being usable for the transmissions in the configured grant configuration.

Aspect 3: The method of any of aspects 1 through 2, wherein selectively transmitting over the configured grant uplink shared channel using one of the first set of power control parameters or the second set of power control parameters comprises: refraining from transmitting over the configured grant uplink shared channel in accordance with the power control selection and based at least in part on the downlink control information having the format.

Aspect 4: The method of aspect 3, wherein receiving the downlink control information having the format for the configured grant uplink shared channel is an error case based at least in part on multiple sets of power control parameters being usable for the transmissions in the configured grant configuration.

Aspect 5: The method of any of aspects 1 through 4, further comprising: receiving signaling indicating that one of the first set of power control parameters or the second set of power control parameters is to be used for configured grant uplink shared channel transmissions that are scheduled by the downlink control information having the format based at least in part on multiple sets of power control parameters being usable for the transmissions in the configured grant configuration, wherein selectively transmitting over the configured grant uplink shared channel is based at least in part on receiving the signaling.

Aspect 6: The method of aspect 5, wherein selectively transmitting over the configured grant uplink shared channel using one of the first set of power control parameters or the second set of power control parameters comprises: transmitting over the configured grant uplink shared channel using the one of the first set of power control parameters or the second set of power control parameters in accordance with the power control selection and based at least in part on receiving the signaling, wherein the power control selection is associated with the one of the first set of power control parameters or the second set of power control parameters indicated by the signaling being used for the configured grant uplink shared channel transmissions that are scheduled by the downlink control information having the format based at least in part on the multiple sets of power control parameters being usable for the transmissions in the configured grant configuration.

Aspect 7: The method of any of aspects 1 through 6, further comprising: receiving radio resource control signaling indicating a first path loss compensation factor and a first power control loop index for the first set of power control parameters and a second path loss compensation factor and a second power control loop index for the second set of power control parameters, wherein the first sounding reference signal resource set is associated with the first path loss compensation factor and the first power control loop index and the second sounding reference signal resource set is associated with the second path loss compensation factor and the second power control loop index.

Aspect 8: The method of any of aspects 1 through 7, wherein the downlink control information activates the configured grant uplink shared channel, and the configured grant uplink shared channel comprises a Type 2 configured grant uplink shared channel.

Aspect 9: The method of any of aspects 1 through 8, wherein the downlink control information schedules a retransmission for the configured grant uplink shared channel, and the configured grant uplink shared channel comprises a Type 1 configured grant uplink shared channel or a Type 2 configured grant uplink shared channel.

Aspect 10: The method of any of aspects 1 through 9, wherein the format of the downlink control information comprises a fallback downlink control information format, and the fallback downlink control information format comprises a downlink control information format 0_0.

Aspect 11: The method of any of aspects 1 through 10, wherein the first sounding reference signal resource set and the first set of power control parameters are associated with communication with a first transmission and reception point and the second sounding reference signal resource set and the second set of power control parameters are associated with communication with a second transmission and reception point.

Aspect 12: A method for wireless communication at a UE, comprising: receiving control signaling activating, for an uplink control channel resource, a first spatial relation associated with a first closed-loop power control operation and a second spatial relation associated with a second closed-loop power control operation; receiving downlink control information indicating a single transmit power control command for the uplink control channel resource; selectively applying the single transmit power control command to one or both of the first closed-loop power control operation or the second closed-loop power control operation in accordance with a transmit power control command application and based at least in part on receiving the downlink control information; and transmitting over the uplink control channel resource based at least in part on the downlink control information and one or both of the first closed-loop power control operation or the second closed-loop power control operation.

Aspect 13: The method of aspect 12, wherein selectively applying the single transmit power control command to one or both of the first closed-loop power control operation or the second closed-loop power control operation comprises: refraining from applying the single transmit power control command to the first closed-loop power control operation and the second closed-loop power control operation in accordance with the transmit power control command application and based at least in part on the downlink control information indicating the single transmit power control command.

Aspect 14: The method of aspect 13, wherein receiving the downlink control information indicating the single transmit power control command for the uplink control channel resource is an error case based at least in part on both the first spatial relation and the second spatial relation being activated for the uplink control channel resource and based at least in part on the downlink control information indicating the single transmit power control command.

Aspect 15: The method of any of aspects 12 through 14, wherein selectively applying the single transmit power control command to one or both of the first closed-loop power control operation or the second closed-loop power control operation comprises: applying the single transmit power control command to the first closed-loop power control operation and the second closed-loop power control operation in accordance with the transmit power control command application and based at least in part on the downlink control information indicating the single transmit power control command for the uplink control channel resource, wherein the transmit power control command application is associated with the single transmit power control command being applied to both the first closed-loop power control operation and the second closed-loop power control operation based at least in part on both the first spatial relation and the second spatial relation being activated for the uplink control channel resource and based at least in part on the downlink control information indicating the single transmit power control command.

Aspect 16: The method of any of aspects 12 through 15, wherein selectively applying the single transmit power control command to one or both of the first closed-loop power control operation or the second closed-loop power control operation comprises: applying the transmit power control command exclusively to the first closed-loop power control operation in accordance with the transmit power control command application and based at least in part on the downlink control information indicating the single transmit power control command for the uplink control channel resource, wherein the transmit power control command application is associated with the single transmit power control command being exclusively applied to the first closed-loop power control operation based at least in part on the first closed-loop power control operation having a relatively lower closed-loop power control index than the second closed-loop power control operation.

Aspect 17: The method of any of aspects 12 through 16, wherein selectively applying the single transmit power control command to one or both of the first closed-loop power control operation or the second closed-loop power control operation comprises: applying the transmit power control command exclusively to the first closed-loop power control operation in accordance with the transmit power control command application and based at least in part on the downlink control information indicating the single transmit power control command for the uplink control channel resource, wherein the transmit power control command application is associated with the single transmit power control command being exclusively applied to the first closed-loop power control operation based at least in part on the first spatial relation associated with the first closed-loop power control operation being activated relatively earlier than the second spatial relation associated with the second closed-loop power control operation.

Aspect 18: The method of any of aspects 12 through 17, wherein selectively applying the single transmit power control command to one or both of the first closed-loop power control operation or the second closed-loop power control operation comprises: applying the transmit power control command exclusively to the first closed-loop power control operation in accordance with the transmit power control command application and based at least in part on the downlink control information indicating the single transmit power control command for the uplink control channel resource, wherein the transmit power control command application is associated with the single transmit power control command being exclusively applied to the first closed-loop power control operation based at least in part on the first spatial relation associated with the first closed-loop power control operation having a relatively lower spatial relation information identifier than the second spatial relation associated with the second closed-loop power control operation.

Aspect 19: The method of any of aspects 12 through 18, wherein the downlink control information has a fallback downlink control information format, and the fallback downlink control information format comprises a downlink control information format 1_0.

Aspect 20: The method of any of aspects 12 through 19, wherein the first spatial relation and the first closed-loop power control operation are associated with communication with a first transmission and reception point and the second spatial relation and the second closed-loop power control operation are associated with communication with a second transmission and reception point.

Aspect 21: An apparatus for wireless communication at a UE, comprising a processor; memory coupled with the processor; and instructions stored in the memory and executable by the processor to cause the apparatus to perform a method of any of aspects 1 through 11.

Aspect 22: An apparatus for wireless communication at a UE, comprising at least one means for performing a method of any of aspects 1 through 11.

Aspect 23: A non-transitory computer-readable medium storing code for wireless communication at a UE, the code comprising instructions executable by a processor to perform a method of any of aspects 1 through 11.

Aspect 24: An apparatus for wireless communication at a UE, comprising a processor; memory coupled with the processor; and instructions stored in the memory and executable by the processor to cause the apparatus to perform a method of any of aspects 12 through 20.

Aspect 25: An apparatus for wireless communication at a UE, comprising at least one means for performing a method of any of aspects 12 through 20.

Aspect 26: A non-transitory computer-readable medium storing code for wireless communication at a UE, the code comprising instructions executable by a processor to perform a method of any of aspects 12 through 20. It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc Disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), or ascertaining. Also, "determining" can include receiving (such as receiving information), or accessing (such as accessing data in a memory). Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. The disclosure is not limited to the examples and designs described herein but is to be accorded the broadest scope consistent with the principles and novel features disclosed herein.

What is claimed is:

1. A method of wireless communication performed by a user equipment (UE), comprising:
   receiving a configured grant configuration that indicates a first sounding reference signal resource set associated with a first set of power control parameters and a second sounding reference signal resource set associated with a second set of power control parameters;
   receiving downlink control information having a format; and
   transmitting, based at least in part on multiple sets of power control parameters being configured and the downlink control information having the format, over a configured grant uplink shared channel using the first set of power control parameters.

2. The method of claim 1, wherein transmitting over the configured grant uplink shared channel using one of the first set of power control parameters comprises transmitting over the configured grant uplink shared channel using the first set of power control parameters based at least in part on the first set of power control parameters occupying a first set of radio resource control fields prior to a second set of radio resource control fields occupied by the second set of power control parameters.

3. The method of claim 1, further comprising receiving radio resource control signaling indicating a first path loss compensation factor and a first power control loop index for the first set of power control parameters and a second path loss compensation factor and a second power control loop index for the second set of power control parameters, wherein the first sounding reference signal resource set is associated with the first path loss compensation factor and the first power control loop index and the second sounding reference signal resource set is associated with the second path loss compensation factor and the second power control loop index.

4. The method of claim 1, wherein the downlink control information activates the configured grant uplink shared channel, and the configured grant uplink shared channel comprises a Type 2 configured grant uplink shared channel.

5. The method of claim 1, wherein the downlink control information schedules a retransmission for the configured grant uplink shared channel, and the configured grant uplink shared channel comprises a Type 1 configured grant uplink shared channel or a Type 2 configured grant uplink shared channel.

6. The method of claim 1, wherein the format is format 0_0.

7. A method of wireless communication performed by a user equipment (UE), comprising:
receiving control signaling that activates, for an uplink control channel resource, a first spatial relation associated with a first closed-loop power control adjustment state and a second spatial relation associated with a second closed-loop power control adjustment state;
receiving downlink control information that indicates a single transmit power control command for the uplink control channel resource; and
applying, based at least in part on the downlink control information indicating the single transmit power control command for the uplink control channel resource, the single transmit power control command to the first closed-loop power control adjustment state and the second closed-loop power control adjustment state; and
transmitting over the uplink control channel resource based at least in part on the downlink control information and one or both of the first closed-loop power control adjustment state or the second closed-loop power control adjustment state.

8. The method of claim 7, wherein the downlink control information has a fallback downlink control information format, and the fallback downlink control information format comprises a downlink control information format 1_0.

9. The method of claim 7, wherein the control signaling comprises one or more medium access control (MAC) control elements (MAC-CEs).

10. A user equipment (UE) for wireless communication, comprising:
at least one memory, and
at least one processor coupled to the at least one memory, wherein the at least one processor is configured to:
receive a configured grant configuration that indicates a first sounding reference signal resource set associated with a first set of power control parameters and a second sounding reference signal resource set associated with a second set of power control parameters;
receive downlink control information having a format; and
transmit, based at least in part on multiple sets of power control parameters being configured and the downlink control information having the format, over a configured grant uplink shared channel using the first set of power control parameters.

11. The UE of claim 10, wherein, to transmit over the configured grant uplink shared channel using one of the first set of power control parameters, the at least one processor is configured to transmit over the configured grant uplink shared channel using the first set of power control parameters based at least in part on the first set of power control parameters occupying a first set of radio resource control fields prior to a second set of radio resource control fields occupied by the second set of power control parameters.

12. The UE of claim 10, wherein the downlink control information activates the configured grant uplink shared channel, and the configured grant uplink shared channel comprises a Type 2 configured grant uplink shared channel.

13. The UE of claim 10, wherein the downlink control information schedules a retransmission for the configured grant uplink shared channel, and the configured grant uplink shared channel comprises a Type 1 configured grant uplink shared channel.

14. The UE of claim 10, wherein the downlink control information schedules a retransmission for the configured grant uplink shared channel, and the configured grant uplink shared channel comprises a Type 2 configured grant uplink shared channel.

15. The UE of claim 10, wherein the format is format 0_0.

16. A user equipment (UE) for wireless communication, comprising:
at least one memory; and
at least one processor coupled to the at least one memory, wherein the at least one processor is configured to:
receive control signaling that activates, for an uplink control channel resource, a first spatial relation associated with a first closed-loop power control adjustment state and a second spatial relation associated with a second closed-loop power control adjustment state;
receive downlink control information that indicates a single transmit power control command for the uplink control channel resource;
apply, based at least in part on the downlink control information indicating the single transmit power control command for the uplink control channel resource, the single transmit power control command to the first closed-loop power control adjustment state and the second closed-loop power control adjustment state; and
transmit over the uplink control channel resource based at least in part on the downlink control information and one or both of the first closed-loop power control adjustment state or the second closed-loop power control adjustment state.

17. The UE of claim 16, wherein the downlink control information has a fallback downlink control information format, and the fallback downlink control information format comprises a downlink control information format 1_0.

18. The UE of claim 16, wherein the control signaling comprises one or more medium access control (MAC) control elements (MAC-CEs).

* * * * *